United States Patent
Halbritter et al.

(10) Patent No.: US 7,022,017 B1
(45) Date of Patent: Apr. 4, 2006

(54) INTERACTIVE RESORT OPERATING SYSTEM

(75) Inventors: Arthur R. Halbritter, Rome, NY (US); Frank J. Riolo, Rome, NY (US); Craig A. Clark, Manlius, NY (US); James R. Lavole, Voluntown, CT (US); John A. Santini, Jr., Wakefiled, RI (US)

(73) Assignee: Oneida Indian Nation, Vernon, NY (US)

( * ) Notice: Subject to any disclaimer, the term of this patent is extended or adjusted under 35 U.S.C. 154(b) by 0 days.

(21) Appl. No.: 09/488,556

(22) Filed: Jan. 21, 2000

Related U.S. Application Data

(63) Continuation-in-part of application No. 08/877,375, filed on Jun. 17, 1997, now Pat. No. 6,280,328, which is a continuation-in-part of application No. 08/719,651, filed on Sep. 25, 1996, now Pat. No. 5,674,128.

(51) Int. Cl.
*A63F 13/00* (2006.01)
*G07F 17/34* (2006.01)

(52) U.S. Cl. .......................................... 463/42; 463/25
(58) Field of Classification Search ............ 463/16–20, 463/25, 42; 705/5, 10
See application file for complete search history.

(56) References Cited

U.S. PATENT DOCUMENTS

| | | | |
|---|---|---|---|
| 4,240,635 A | 12/1980 | Brown | |
| 4,283,709 A | 8/1981 | Lucero et al. | |
| 4,335,809 A | 6/1982 | Wain | |
| 4,339,798 A | 7/1982 | Hedges et al. | |
| 4,359,631 A * | 11/1982 | Lockwood et al. | 235/381 |
| 4,467,424 A | 8/1984 | Hedges et al. | |
| 4,494,197 A | 1/1985 | Troy et al. | |
| 4,575,622 A | 3/1986 | Pellegrini | |
| 4,636,951 A | 1/1987 | Harlick | |
| 4,648,600 A | 3/1987 | Olliges | |
| 4,669,730 A | 6/1987 | Small | |
| 4,760,527 A | 7/1988 | Sidley | |
| 4,815,741 A | 3/1989 | Small | |
| 4,856,787 A | 8/1989 | Itkis | |
| 4,880,237 A | 11/1989 | Kishishita | |
| 4,882,473 A | 11/1989 | Bergeron et al. | |
| 4,926,327 A | 5/1990 | Sidley | |
| 4,994,908 A * | 2/1991 | Kuban et al. | 358/86 |
| 5,038,022 A | 8/1991 | Lucero | |

(Continued)

FOREIGN PATENT DOCUMENTS

EP 0769769 * 4/1997

(Continued)

OTHER PUBLICATIONS

Banks, Michael A., "America Online: A Graphics-Based Success", Link-UP, Feb. 1992, pp 12, 14 and 15.*

(Continued)

*Primary Examiner*—Jessica J. Harrison
(74) *Attorney, Agent, or Firm*—Finnegan, Henderson, Farabow, Garrett, and Dunner L.L.P.

(57) ABSTRACT

Systems and methods consistent with the present invention allow guests at a hospitality facility to request hospitality facility services from a remote terminal. For example, guests can order merchandise (such as event tickets, food and drink, and retail items), make reservations (for example, at hotels, restaurants, and golf courses), and transfer funds between their gaming and services accounts. Hospitality facility operators can then track the preferences of their guests by storing guest preference information and updating the guest preference information each time a guest requests a service. Based on the stored guest preference information, hospitality facility operators can selectively offer each guest those services most desired by the guest.

38 Claims, 13 Drawing Sheets

U.S. PATENT DOCUMENTS

| | | | |
|---|---|---|---|
| 5,119,295 A | 6/1992 | Kapur | |
| 5,159,549 A | 10/1992 | Hallman, Jr. et al. | |
| 5,179,517 A | 1/1993 | Sarbin et al. | |
| 5,197,094 A | 3/1993 | Tillery et al. | |
| 5,223,698 A | 6/1993 | Kapur | |
| 5,259,613 A * | 11/1993 | Marnell, II | 463/42 |
| 5,265,874 A | 11/1993 | Dickinson et al. | |
| 5,287,269 A | 2/1994 | Dorrough et al. | |
| 5,297,802 A | 3/1994 | Pocock et al. | |
| 5,324,035 A | 6/1994 | Morris et al. | |
| 5,326,104 A | 7/1994 | Pease et al. | |
| 5,332,076 A | 7/1994 | Ziegert | |
| 5,371,345 A | 12/1994 | LeStrange et al. | |
| 5,408,417 A | 4/1995 | Wilder | 364/479 |
| 5,429,361 A | 7/1995 | Raven et al. | |
| 5,581,461 A * | 12/1996 | Coll et al. | 705/5 |
| 5,613,912 A | 3/1997 | Slater | 463/25 |
| 5,655,961 A | 8/1997 | Acres et al. | |
| 5,674,128 A | 10/1997 | Holch et al. | 463/42 |
| 5,722,890 A | 3/1998 | Libby et al. | |
| 5,732,398 A * | 3/1998 | Tagawa | 705/5 |
| 5,755,621 A | 5/1998 | Marks et al. | 463/42 |
| 5,761,647 A * | 6/1998 | Boushy | 705/40 |
| 5,762,552 A | 6/1998 | Vuong et al. | 463/25 |
| 5,770,533 A | 6/1998 | Franchi | 463/42 |
| 5,797,794 A | 8/1998 | Angell | |
| 5,800,269 A | 9/1998 | Holch et al. | 463/42 |
| 5,823,879 A | 10/1998 | Goldberg et al. | 463/42 |
| 5,830,068 A | 11/1998 | Brenner et al. | 463/42 |
| 5,836,817 A | 11/1998 | Acres et al. | 463/26 |
| 5,917,725 A | 6/1999 | Thacher et al. | 364/410.1 |
| 5,949,411 A | 9/1999 | Doerr et al. | 345/327 |
| 5,971,271 A * | 10/1999 | Wynn et al. | 463/42 |
| 5,971,849 A * | 10/1999 | Falciglia | 463/16 |
| 6,039,648 A * | 3/2000 | Guinn et al. | 463/16 |
| 6,049,823 A * | 4/2000 | Hwang | 725/82 |
| 6,089,982 A | 7/2000 | Holch et al. | |
| 6,093,100 A * | 7/2000 | Singer et al. | 463/13 |
| 6,101,477 A * | 8/2000 | Hohle et al. | 705/1 |
| 6,110,041 A * | 8/2000 | Walker et al. | 463/20 |
| 6,113,495 A * | 9/2000 | Walker et al. | 463/42 |
| 6,264,560 B1 * | 7/2001 | Goldberg et al. | 463/42 |
| 6,508,709 B1 * | 1/2003 | Karmarkar | 463/42 |
| 2002/0166126 A1 * | 11/2002 | Pugh et al. | 725/78 |

FOREIGN PATENT DOCUMENTS

| | | |
|---|---|---|
| WO | WO 89/06998 | 8/1989 |
| WO | WO95/30944 | * 11/1995 |

OTHER PUBLICATIONS

POT-O-GOLD, 19' Touchscreen Multi-Game Terminal Toucheasy Keno Play Description.
POT-O-GOLD, 19' Touchscreen Multi-Game Terminal Superpick Lotto Play Description.
POT-O-GOLD, 19' Touchscreen Multi-Game Terminal Touch 6 Lotto Play Description.
POT-O-GOLD, 19' Touchscreen Multi-Game Terminal Touch 6 Lotto Technical Description.
POT-O-GOLD, 19' Touchscreen Multi-Game Terminal Supergold Bingo Play Description.
Casinolink, Milkohn Worldwide.
Casinolink System, Mikohn Worldwide.
QuikTrack, Quick Track Gaming, Inc.
Oasis II, CDS Systems and Services.
The Future of Gaming Today, Casino Data Systems.
Casino Systems Solutions, IGT International Game Technology.
Welcome to Casino Data Systems, Casino Data Systems.
Introducing A World Of Opportunities, Bally Systems.
Software Offerings, Advanced Computer Services.
SafeJack, Mikohn Worldwide.
Yerak, Becky, At cashless slots: You've got mail, and a jackpot, USA Today, Nov. 13, 2000, p. 2E.
Standing Stone Gaming: Open Gaming Protocol (OGP) Specification, *Integrated Performance Decisions*, Version 2.1, pp. 1-58, dated Apr. 5, 1999.

* cited by examiner

INTERACTIVE RESORT OPERATING SYSTEM

RELATED APPLICATIONS

This application is a continuation-in-part of U.S. patent application Ser. No. 08/877,375, U.S. Pat. No. 6,280,328, filed Jun. 17, 1997, which is a continuation-in-part of U.S. patent application Ser. No. 08/719,651, filed Sep. 25, 1996, now U.S. Pat. No. 5,674,128. The contents of U.S. patent application Ser. No. 08/877,375 and U.S. patent application Ser. No. 08/719,651 are hereby incorporated by reference.

BACKGROUND OF THE INVENTION

This invention relates generally to the field of interactive computer systems, and more particularly to a system and method for use in a hospitality facility to provide merchandise purchasing or activity scheduling.

Hospitality facilities, such as hotels, motels, gaming casinos, and resorts, operate in a highly competitive environment. In order to attract new and repeat customers, such hospitality facilities have traditionally tried to make customers feel welcome and appreciated. In addition, hospitality facilities may offer customers a wide variety of amenities and services, such as shopping, golf courses, tennis courts, restaurants, room service, amusements, theme parks, valet services, and other entertainment options like concerts, theater, and sporting events. As hospitality facilities have grown to include a wide variety of amenities and services, however, it has become increasingly difficult to provide personal attention to each guest. For example, hospitality facilities generally cannot keep track of the likes and dislikes of each guest. Consequently, they cannot selectively offer each guest those amenities and services most appealing to the guest.

Casino resort operators face additional problems. In addition to providing players (i.e., guests) with a sense of intimacy and a wide variety of non-gaming amenities and services, casino resort operators generally want to keep players at the video game terminals as long as possible, thus maximizing casino revenue and the players' gaming time. A player must leave a video game terminal to purchase food and drink, reserve a tee time at the golf course, or reserve a table at a restaurant.

SUMMARY OF THE INVENTION

A hospitality facility operating system consistent with this invention comprises a plurality of client terminals coupled together. Each client terminal includes means for receiving guest identification information from a participating one of the hospitality facility guests, a video display for displaying a menu of available hospitality facility services, and means for receiving selection information from the participating guest indicating one of the plurality of resort services. The system also includes a central controller connected to each of the client terminals. The central controller includes means for receiving the guest identification and selection information from the client terminal, means for storing preference information for each of the guests, and means for transmitting, to the client terminals, a response based on the received selection information or the received identification information.

In addition, a method consistent with this invention of operating a hospitality facility system in a network including a central controller and a plurality of client terminals includes establishing a services account file, including guest preference data, at a central controller for a participating hospitality facility guest. A terminal, coupled to the central controller, receives guest identification information input by the participating hospitality facility guest, and a video display of the terminal displays a menu listing one or more hospitality facility services. The terminal receives selection information from the participating hospitality facility guest indicating a selected one of the hospitality facility services and sends the guest identification information and the selection information to the central controller. After each selection by the guest, the central controller updates the stored preference information of the guest according to the guest selection information.

Both the foregoing general description and the following detailed description are exemplary and explanatory, and are intended to provide further explanation of the claimed invention.

BRIEF DESCRIPTION OF THE DRAWINGS

The accompanying drawings, which are incorporated in and constitute a part of the specification, illustrate presently preferred implementations of the invention. Together with the general description given above and the detailed description of the preferred embodiments given below, the drawings explain the principles of the invention.

In the drawings.

DETAILED DESCRIPTION OF THE INVENTION

Reference will now be made in detail to the construction and operation of preferred implementations consistent with the present invention that are illustrated in the accompanying drawings. In those drawings, like elements and operations are designated with the same reference numbers when possible.

Systems and methods consistent with the present invention allow guests at a hospitality facility to request hospitality facility services from a remote terminal. For example, guests can order merchandise (such as event tickets, food and drink, and retail items), make reservations (for example, at hotels, restaurants, and golf courses), and transfer funds between their gaming and services accounts. Systems and methods consistent with the present invention may track the preferences of the guests by storing guest preference information and updating the guest preference information each time a guest requests a service at the remote terminals. Based on the stored guest preference information, hospitality facility operators, through interactive menus displayed on the remote terminals or through other communication medium, can selectively offer each guest those services most desired by the guest.

Figure 1:
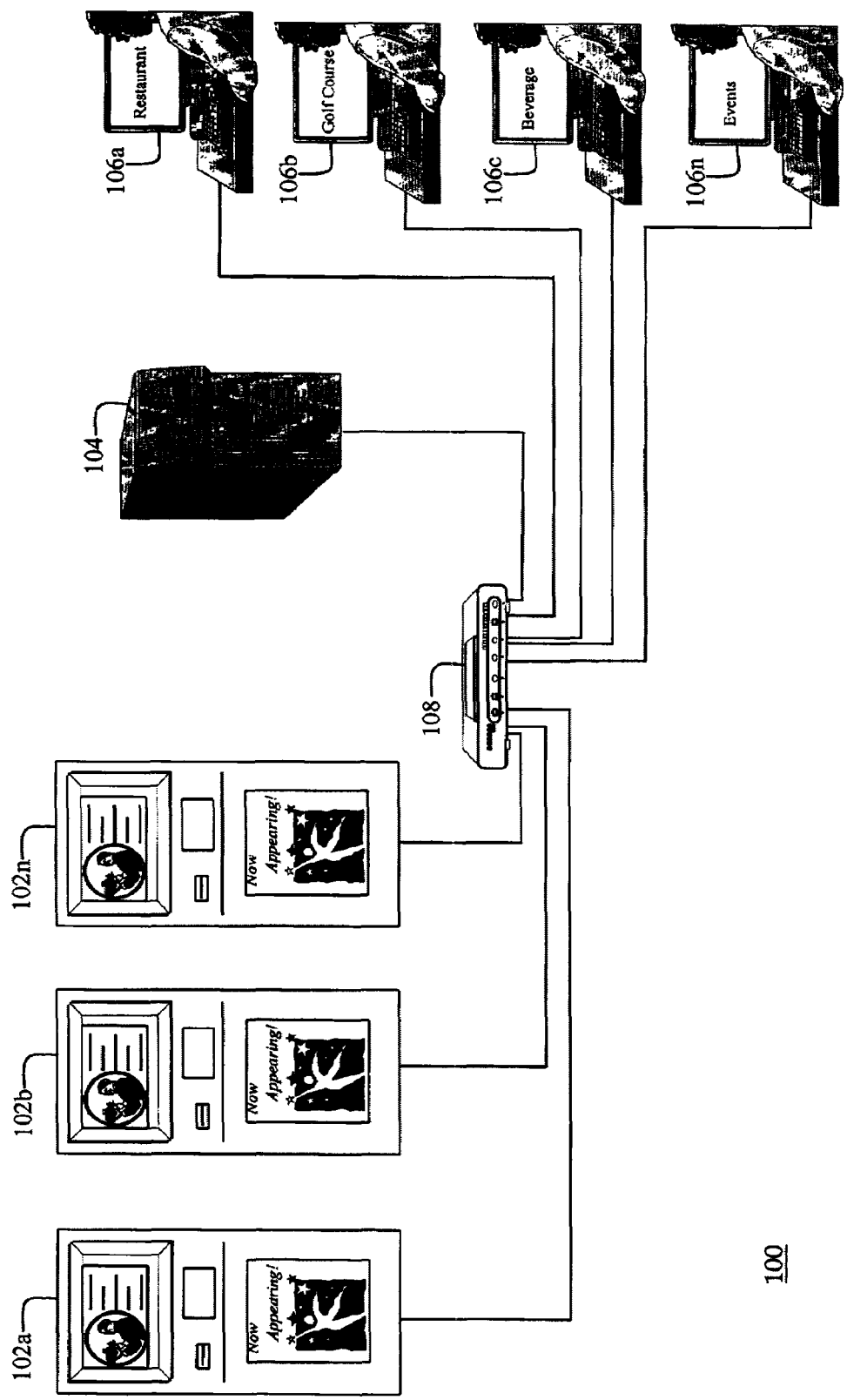
FIG. 1 is a schematic representation of an interactive services system consistent with the present invention.

FIG. 1 shows a schematic representation of an interactive services network 100 in accordance with a preferred embodiment of the present invention. As shown, interactive services network 100 generally comprises a plurality of kiosk terminals 102a–102n, an amenities server 104, and a plurality of service-client stations 106a–106n, all connected via a network switch 108. Kiosk terminals 102a–102n interact with amenities server 104 and service-client stations 106a–106n to allow guests of a hospitality facility to order merchandise, schedule events, transfer funds, and obtain information about services offered by the hospitality facility. Kiosk terminals 102a–102n are preferably located in public areas of the hospitality facility (e.g., in a hotel lobby). Each of kiosk terminals 102a–102n receives identification information and service requests from a participating guest, and transmits the guest identification information and service requests to amenities server 104.

Amenities server 104 maintains and controls kiosk terminals 102a–102n and service-client stations 106a–106n, stores service account and preference information for each of the participating hospitality resort guests, processes services requests received from kiosk terminals 102a–102n, and transmits menus (e.g., in the form of text, graphics, video, audio) and other data to kiosk terminals 102a–102n and client stations 106a–106n for display or further processing. Amenities server 104 is preferably located in a secured area of the hospitality facility, accessible by authorized resort personnel only. In the embodiment of FIG. 1, only one amenities server 104 is shown. However, as the size of the network grows and the number of service transactions increase, additional amenities servers 104 may be added. For example, interactive services network 100 could include a separate amenities server 104 for each service offered by the hospitality facility.

Service-client stations 106a–106n generally comprise conventional PC terminals running off-the-shelf browser software. Service-client stations 106a–106n are preferably used only by personnel at the hospitality facility. For example, service-client station 106a might be located at the hostess station in a restaurant in the hospitality facility, service-client station 106b might be located in the club house of a golf course at the hospitality facility, service-client station 106c might be located at a bar in the hospitality facility, and service-client station 106n might be located at a ticketing office in the hospitality facility. When processing service requests from kiosk terminals 102, amenities server 104 may send notification to service-client stations 106a–106n. For example, amenities server 104 transmits food and drink order 14 information (e.g., guest name, guest location, and food and drink order) to service-client station 106c for display to the bartender. In addition, amenities server 104 preferably transmits restaurant reservation information (e.g., guest name, number of persons in guest's party, guest smoking or non-smoking preferences, and the day and time of the reservation) to service-client station 106a for display to the hostess. The display allows the hostess to verify the day and time of a guest's reservations when the guest arrives at the restaurant. In addition, service-client stations 106a–106n can perform typical administrative tasks (e.g., allocate tables in restaurant, allocate seats for concert, etc.) and generate reports (e.g., report of no shows, time variances, etc.). Service-client stations 106a–106n may include a printer for printing the reports.

Interactive services network 100 may comprise, for example, an Ethernet network according to the IEEE 802.3 standard. Of course, the invention is not limited to an Ethernet network and the network could comprise any other local area network (LAN) or wide area network (WAN) or any combination of such networks.

In a preferred embodiment, interactive services network 100 uses Internet protocols and technologies to send menus (e.g., in the form of web pages) and other multimedia information from amenities server 104 to kiosk terminals 102a–102n and service-client stations 106a–106n. For example, kiosk terminals 102a–102n, amenities server 104, and service-client stations 106a–106n communicate using the Hypertext Transfer Protocol (HTTP) and other Transmission Control Protocol/Internet Protocol (TCP-IP) for transport and Hypertext Markup Language (HTML) for describing the menus and other multimedia information. Of course, systems and methods consistent with the invention are not limited to Internet protocols or languages, and any other protocols and languages could be used to facilitate communication between the network modules.

In accordance with one embodiment of the present invention, a guest wishing to use interactive services system 100 to request hospitality facility services can establish an account and receive a magnetic I.D. card at a service-client station 106a–106n (located, for example, at the front desk of a hotel) or at an account establishment terminal (not shown). Preferably, the guest provides an operator with some identifier information (e.g., name, address, and/or date of birth) and preference information (e.g., preferred beverage, snack, language, restaurant, and/or golf course). Amenities server 104 establishes a services account file for the guest and issues the guest a unique services account number. In addition, the operator may ask the customer to select a personal identification number ("PIN") via a keypad. The guest identifier information, the account number, and an encrypted version of the PIN is then stored on a magnetic strip on a magnetic I.D. card issued by a conventional magnetic card issue system. Designating the amount of funds to be placed in a guest's services account can be done a variety of ways. For example, the guest could deposit money in the services account, the hospitality facility could preauthorize a predetermined amount in the services account, or a credit card company could preauthorize a predetermined amount in the services account.

The account establishment terminal or service-client station 106 may also include a scanning device for scanning and storing a guest's signature or photograph or scanning a guest's drivers license. In one embodiment, recognition software detects the guest's identifier information (e.g., name, address, and/or date of birth) from the guest's drivers license. In an alternative embodiment, the guest's identifier information and preference information could be sent to interactive services system 100 before the guest arrives at the hospitality facility (e.g., via the Internet) so the guest's card would be ready when the guest arrived at the hospitality facility. In yet another embodiment, guests are automatically registered for the interactive services system upon arrival at the hospitality facility.

Figure 2:
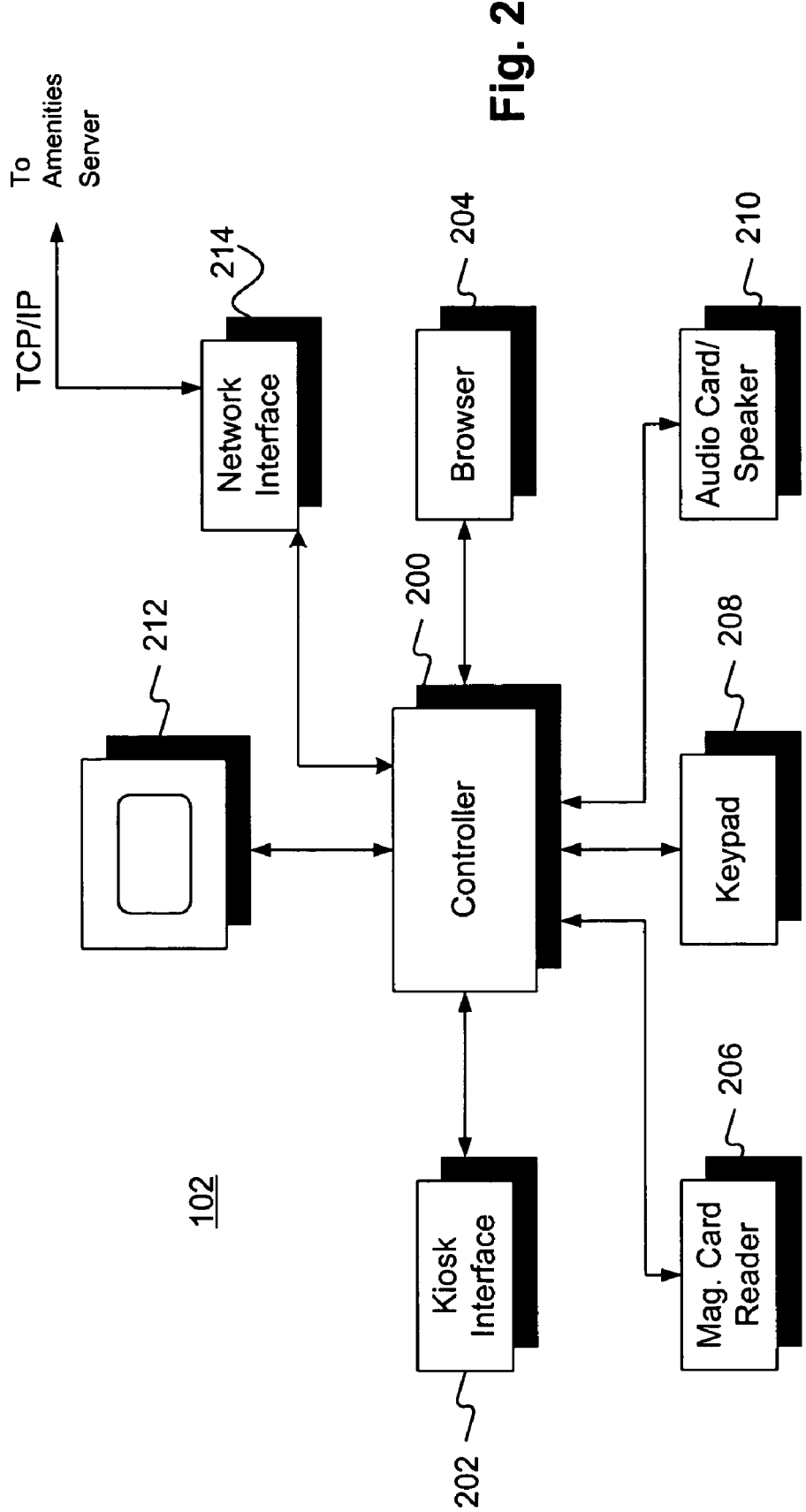
FIG. 2 is a block diagram of a kiosk terminal consistent with the present invention.

FIG. 2 illustrates a block diagram of a kiosk terminal 102 in accordance with one embodiment of the invention. As shown, kiosk terminal 102 generally comprises a controller 200, a kiosk interface 202, a browser 204, a magnetic card reader 206, a keypad 208, a sound card/speakers module 210, a video display with touch screen capability 212, and a network interface 214. Kiosk interface 202 preferably comprises a software application for displaying attract mode graphics to attract a guest to the kiosk terminal. Magnetic card reader 206 preferably comprises a conventional magnetic card reader capable of reading a credit card- or smart card-type guest identification card. The type of card will dictate the type of card reader.

Browser 204 comprises a conventional software application for issuing HTTP requests OFFICES to the amenities server 104. For example, browser 204 can request a specific web page or ask amenities server 204 to perform a database query. Browser 204 reads HTML codes embedded in the web pages received from amenities server 104 to determine how, where, and in what colors and fonts the elements on the web pages must be displayed.

Keypad 208 preferably comprises a conventional alphanumeric or numeric key entry device. Keypad 208 permits a guest to enter a PIN to verify the identity of the guest at kiosk terminal 102. Sound card/speaker module 210 comprises a conventional sound card, amplifier, and speaker for presenting audio.

Video display 212 preferably comprises a conventional touch screen video monitor for displaying video graphics and receiving guest inputs. A touch screen is not necessary, however, since guest inputs can be made through keypad 208.

Network interface 214 transmits the requests from browser 204 to amenities server 104.

The requests are broken into HTTP packets that are sent across the TCP/IP network infrastructure to the amenities server 104. Network interface 214 also receives incoming messages addressed to kiosk terminal 102. In addition, network interface 214 checks for errors in transmission using, for example, cyclical redundancy check ("CRC").

Although not shown, kiosk terminal 102 may include a printer device to print, for example, web pages received from amenities server 104.

Figure 3:
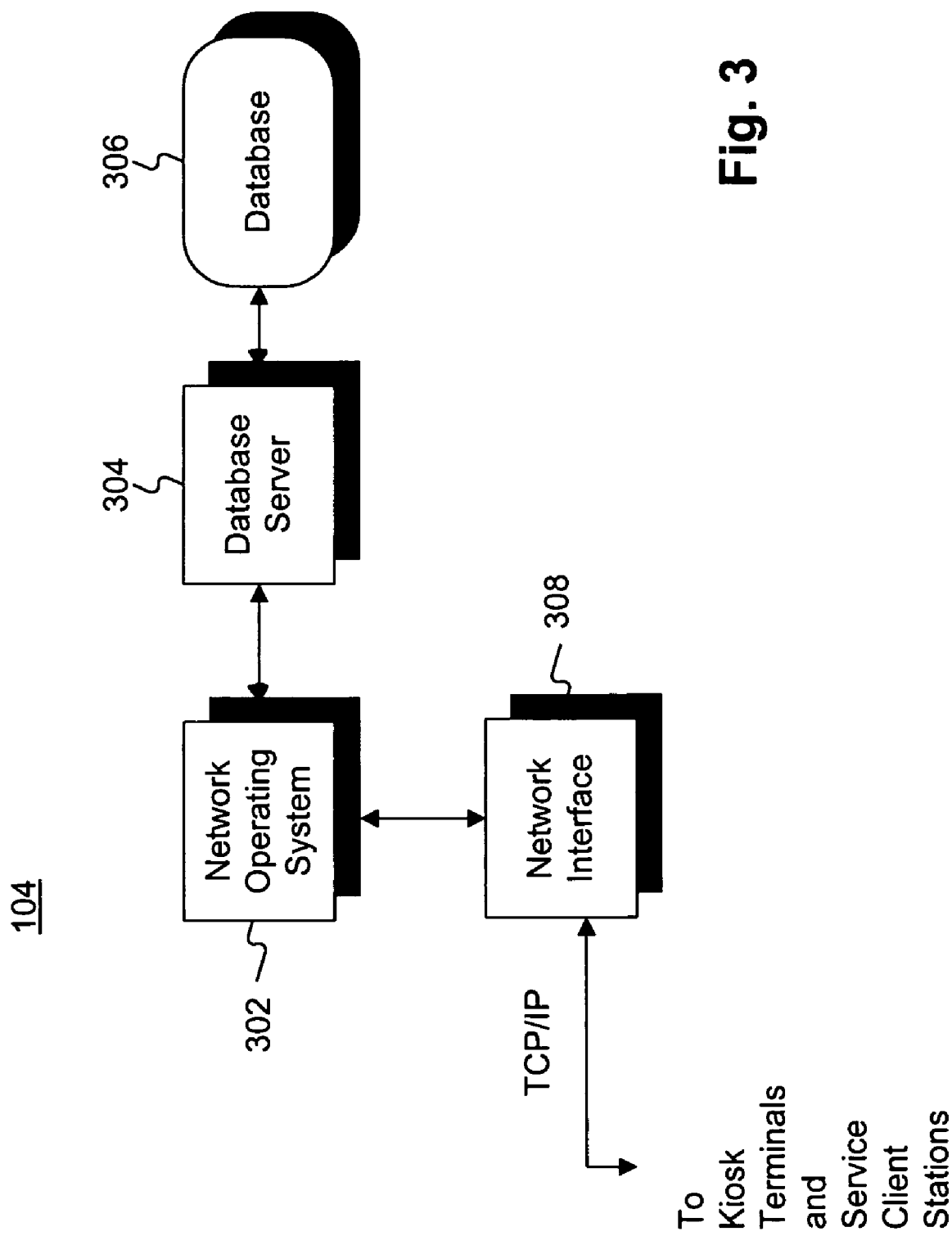
FIG. 3 is a block diagram of a amenities server consistent with the present invention.

FIG. 3 illustrates a block diagram of amenities server 104. As shown, amenities server 104 generally comprises network operating system 302, a database server 304, a relational database 306, and a network interface 308. Network operating system 302 comprises a conventional network operating system such as Windows NT Server. Network operating system 302 processes requests from kiosk terminals 102a–102n and service-client stations 106a– 106n, monitors network hardware and software, coordinates communication in the network, and provides transaction security.

Database server 304 builds and maintains database 306. In addition, database server 304 retrieves from database 306 guest preference information, service account information, graphical menus, and other multimedia information responding to requests from kiosk terminals 102a–102n and service-client stations 106a–106n. In a preferred embodiment, database server 304 is a SQL server. Database 306 is a relational database for storing guest preference information corresponding to each participating guest, guest service account information corresponding to each participating guest, graphical menus, and other multimedia information.

Operating like network interface 214 (described above in connection with FIG. 2), network interface 308 transmits information to and receives information from kiosk terminals 102a–102n and service-client workstations 106a–106n. In addition, network interface 308 checks for errors in transmission using, for example, CRC.

Figure 4:
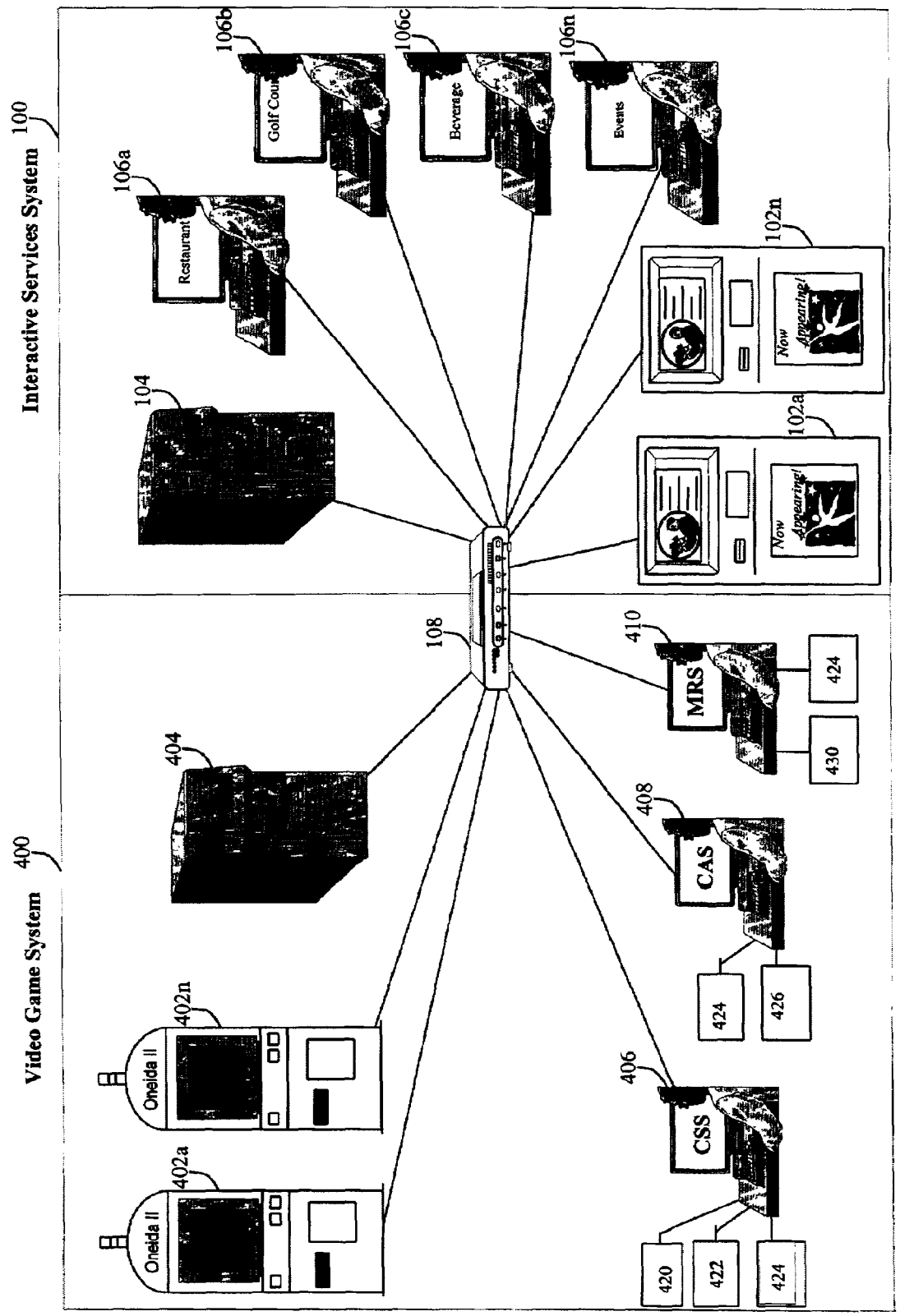
FIG. 4 is a schematic representation of a video game and interactive services system consistent with the present invention.

FIG. 4 shows a schematic representation of a video game and interactive services system in accordance with a preferred embodiment of the present invention. As shown, the video game and interactive services system generally comprises an interactive services system 100 and a video game system 400. As shown, interactive services system 100 is identical to interactive services system 100 in FIG. 1 and includes a plurality of kiosk terminals 102a–102n, amenities server 104, and a plurality of service-client stations 106a–106n. Video game system 400 comprises a plurality of player terminals 402a–402n, a transaction processor subsystem 404, one or more customer service stations 406, one or more cashier stations 408, and one or more management and reporting stations 410. Video game system 400 may comprise, for example, the cashless gaming system disclosed in U.S. patent application Ser. No. 08/877,375 and U.S. Pat. No. 5,674,128, both incorporated herein by reference.

The video game and interactive services system of FIG. 4 preferably comprises an Ethernet network. The network modules communicate via network switch 416 using TCP/IP protocols. In a preferred embodiment, communication between some or all of the network modules occurs via the Standing Stone Gaming Open Protocol, Specification Version 2.1, incorporated herein by reference. Of course, as discussed above in connection with FIG. 1, the invention is not limited to an Ethernet LAN and the network connections could take the form of any other feasible network connections and the network modules could communicate using any other feasible protocols.

Player terminals 402a–402n are like kiosk terminals 102a–102n in that player terminals 402a–402n interact with amenities server 104 and service-client stations 106a–106n to allow casino resort guests to request casino resort services (e.g., order merchandise, schedule events, transfer funds between their services and gaming accounts) and obtain information about services offered by the casino resort. Each of player terminals 402a–402n receives identification information and service requests from a participating player (i.e., guest), and transmits the player identification information and service requests to amenities server 104. In addition, player terminals 402a–402n interact with transaction processor subsystem 404 to provide electronic gambling. In FIG. 4, player terminals 402a–402n may be used in place of kiosk terminals 102a–102n (not shown) or in combination with kiosk terminals 102a–102n (as shown).

A transaction processor subsystem 404 provides a centralized control means for monitoring and administering all video games and player gaming accounts. Transaction processor subsystem 404 tracks each player's game and service request activity, preferably after each game and after each service request (i.e., on a per-game and per-transaction basis), to maintain current and comprehensive information about the players at any time during the player's session at player terminals 402a–402n. In addition, transaction processor subsystem 404 controls player terminal login and logoff, sends the preferred terminal settings of the player logged in at player terminal 104 to player terminal 104, generates and distributes scratch tickets, sends new software and software upgrades to player terminals 402a–402n, and sends reconfiguration commands to player terminals 402a–402n. In a preferred embodiment, transaction processor subsystem 404 comprises a UNIX server.

As shown in FIG. 4, transaction processor subsystem 404 preferably controls one or more customer service stations 406, one or more cashier stations 408, and one or more management and reporting stations 410. Customer service station 406 preferably comprises an operator terminal, connected to transaction processor subsystem 404 via an Ethernet connection, a scanner 420, a magnetic card issue system 422, and a keypad 424. Cashier station 408 preferably comprises an operator terminal, connected to the transaction processor subsystem 404 via an Ethernet connection, a magnetic card reader 426, and a keypad 424. Management and reporting station 410 preferably comprises an operator terminal, connected to the transaction processor subsystem 404 via an Ethernet connection, a keypad 424, and a printer 430. Magnetic card reader 426 and magnetic card issue system 422 preferably comprise conventional devices for reading and generating credit card-type magnetic cards. Scanner 420 preferably comprises a conventional device for scanning text, graphics, and/or photographs. Likewise, keypads 424 preferably comprise conventional alphanumeric or numeric keypads, and the operator terminals preferably comprise conventional PC or networked data entry terminals. The operator terminals may include touch screens.

Network administrators and other casino resort personnel may interact with the video game and interactive services system through management and reporting station 410. For example, management and reporting station 410 may communicate with transaction processor subsystem 404 to transmit new software and software upgrades to player terminals 402a–402n and to remotely reconfigure player terminals 402a–402n. In addition, management and reporting station 410 may provide a report of varying specificity including a detailed listing of an individual player's activity for a specified time period, a summary of a player's activity over a period of time, actual number of games played by each player, a detailed listing of an individual player's service requests for a specified period of time, or a summary of all players' activity on a particular day or over a period of time. Management and reporting station 410 preferably generates these reports periodically, for example, once every two minutes. Management and reporting station 410 may then generate a player activity report outlining player gambling habits such as frequency of plays, favorite games, nomination of player terminals, and average amount of wagers and player service request habits such as favorite restaurants and golf courses.

Such player tracking reports are valuable to casinos and players. Based on such reports, for example, casinos may tailor the types, number, and wager amount of games offered at player terminals 402a–402n to accommodate player demand. Player terminals 402a–402n may be modified periodically or interactively based on current player demand. In addition, casino resorts may tailor the types and number of services offered at player terminals 402a–402n to accommodate player demand. Additionally, casino resorts may use the reports as a tool to identify players with certain characteristics for marketing purposes. Management and reporting station 410 is preferably located in a secure area of the casino resort.

Central tracking of all player activity on a per-game and per-service transaction basis helps better tailor player terminals 402a–402n based on player use and demand, reduce fraud, and target marketing efforts to players with certain attributes. Additionally, instantaneous information provides greater flexibility for managing gaming establishments. For example, such information may enable a gaming establishment to access information whether player habits qualify for special awards during the play. It also helps detect fraud while it is occurring, for example, by detecting wins that far exceed average statistical odds or a single player playing at multiple player terminals 100 simultaneously. Moreover, real-time maintenance of player activity enables accurate system recovery in emergency situations such as power outage.

As described above, transaction processor subsystem 404 preferably stores player identification information, game account data, game wins and losses, and terminal preferences (e.g., language, colors, volume of bells) for each player. Amenities server 104 preferably stores player identification information, service account data, service preference information, and the historical service requests for each player. In an alternative embodiment consistent with the present invention, one server performs the functions of transaction processor subsystem 404 and amenities server 104, and one database stores all the player information for each player. For example, transaction processor subsystem 104 may provide storage and processing for both the video game system and the interactive services system.

Figure 5:
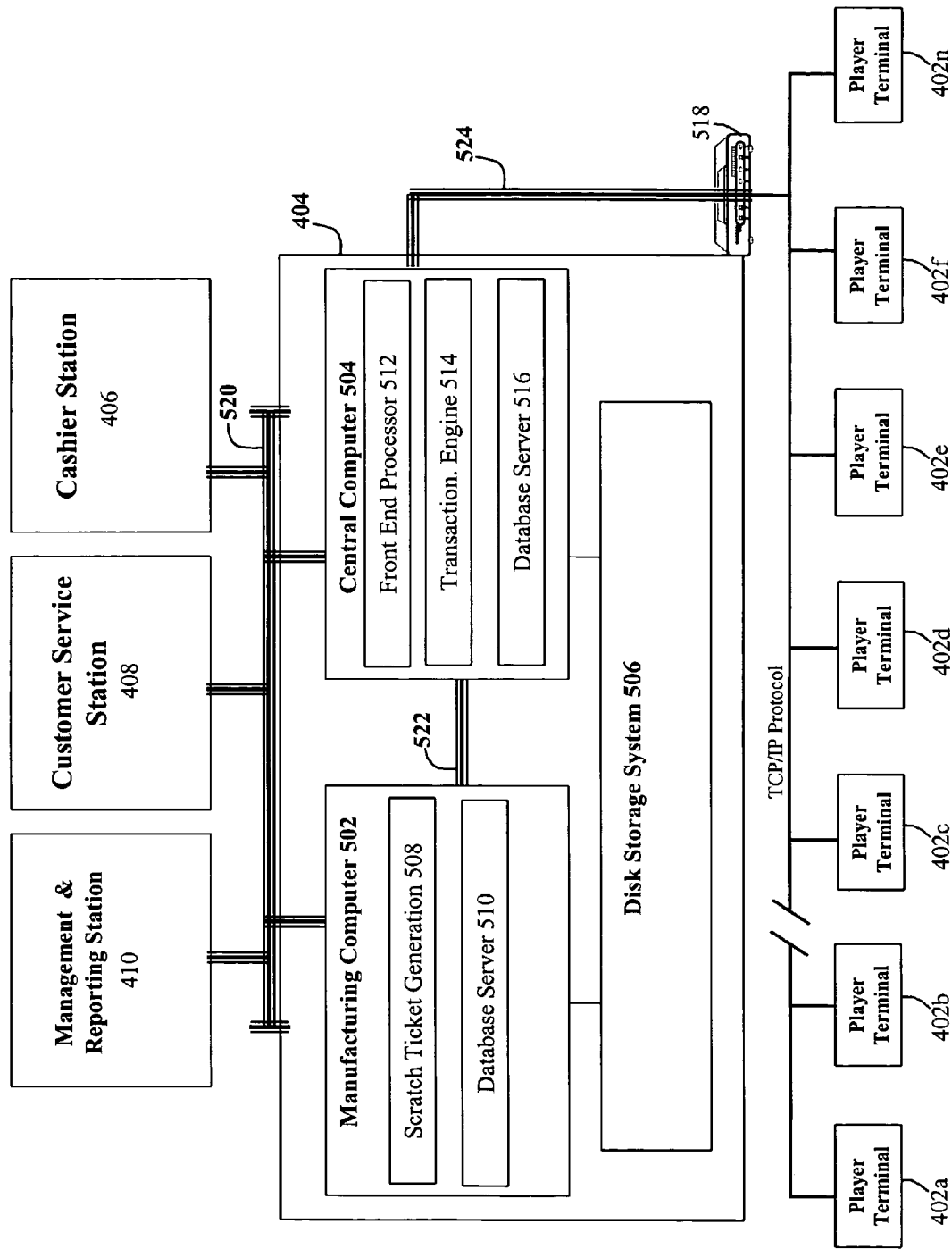
FIG. 5 is a block diagram of a video game system consistent with the present invention.

FIG. 5 shows a block diagram of an improved video game system 400 consistent with the present invention. As shown, video game system 400 may be separated into three virtual LANs (VLANs), management VLAN 520, transaction VLAN 522, and game VLAN 524. In this manner, the traffic between player terminals 402a–402n and transaction processor subsystem 404 can be isolated, providing security to the gaming information. The traffic on management VLAN 520 and game VLAN 524 is preferably encrypted using, for example, the data encryption standard (DES).

As shown in FIG. 5, transaction processor subsystem 404 comprises manufacturing computer 502, central computer 504, and disk storage system 506. Central computer 504 communicates with player terminals 402a–402n via game VLAN 524 and network switch 518. Central computer 504 includes front end processor 512, transaction engine 514, and database server 516. Front end processor 512 decodes, decrypts and error checks messages from player terminals 402a–402n and encodes and encrypts messages to player terminals 402a–402n. Transaction engine 514 receives and sends messages to player terminals 402a–402n via front end processor 512, handles player terminal login and logoff, provides central download of software and configuration commands to player terminals 402a–402n, distributes scratch tickets to player terminals 402a–402n on demand via front end processor 512, and updates game account data stored in disk storage system 506 on a per transaction basis. Database server 516 manages, stores data in, and retrieves data from disk storage system 506.

Disk storage system 506 stores game account data corresponding to each player, including player identification information, game-related preference information (e.g., player terminal settings), game account information, and game result information. In addition, disk storage system 506 stores scratch ticket game sets and subsets.

Manufacturing computer 502 creates scratch ticket game sets, randomly allocates the scratch tickets in each game set into scratch ticket subsets, and delivers the scratch ticket subsets to central computer 504 upon demand. As shown, manufacturing computer 502 includes a scratch ticket generation module 508 and database server 510. Scratch ticket generation module 508 creates a scratch ticket game set having a predetermined number of winners. Database server 510 stores the scratch ticket game set in disk storage system 506 and secures the game set against alteration, tampering, or unauthorized access. To provide additional security, manufacturing computer 502 may include a backup storage medium in addition to disk storage system 506.

Central computer 504 receives purchase scratch ticket requests from player terminals 402a–402n. If central computer 504 has no scratch tickets available, central computer 504 requests a scratch ticket subset from manufacturing computer 502. After receiving a scratch ticket subset, central computer 504 maintains the electronic scratch tickets in the order received from the manufacturing computer, and transmits the electronic scratch tickets in that order to player terminals 402a–402n on demand. Central computer 504 may simultaneously offer different games based on different scratch ticket game sets.

In an alternative embodiment, central computer 504 includes a random number generator for use in an on-line lottery game. After a participating player at player terminal 402 selects to play an on-line lottery game, the player selects numbers, symbols, or other data. Alternatively, the player may ask for a "quick pick" selection through the use of a random number generator located in player terminal 402a–402n. The player also enters a wager amount. The player's wager and selected numbers, symbols, or other data are provided to the player in tangible form, such as electronic encoding or printing on a paper, card, or other medium. Alternatively, the numbers, symbols, or other data selected by the player may be displayed on the player terminal touch screen/video display. The player is then entered into one or more future on-line lottery games which are conducted by central computer 504. In a preferred embodiment, lottery drawings on central computer 504 occur independently of any player terminal activity and regardless of whether or not players are enrolled in the lottery game. If the numbers, symbols, or other data randomly generated by central computer 504 match the numbers, symbols, or other data selected by the player, the player wins a predetermined amount. Central computer 504 preferably transmits the results of each on-line drawing to the player terminals for display.

In an alternative embodiment, video game system 400 includes one or more game servers in addition to transaction processing subsystem 404. Each player terminal 402a–402n is serviced by one game server. Game servers operate differently than scratch ticket generation and the lottery performed by transaction processing subsystem 404.

A game server preferably generates random numbers once during a predetermined period, e.g., every few seconds. During a given predetermined period, if a player at player terminal 402 enters a wager and presses the "Play" button, the player must await the display of the next set of winning numbers. In the meantime, as soon as the "Play" button is selected, player terminal 402 notifies the game server and the game server enrolls that player terminal 402 in the next game.

Upon expiration of the predetermined period, the game server generates a set of random numbers for each type of game offered at player terminals 402a–402n that it services. The game server then sends the set of random numbers corresponding to the selected game at enrolled player terminal 402. Player terminal 402 receives the corresponding set of random numbers and determines the win or loss of that game. This eliminates the duplicative need for each player terminal 402a–402n to convert the random number for the particular game being played, and simplifies the programming necessary at player terminal 402a–402n.

Each number in the generated set of random numbers may represent the winning number. For example, if keno is selected at player terminal 402 that is enrolled for the next game, game server generates a set of twenty winning numbers. If the result of the game depends on a graphical figure, for example, Lucky Gem where three consecutive diamonds result in a winning jackpot, a predetermined number represents a certain shape of gem. To ensure proper randomization, however, the game server changes randomly or periodically the number corresponding to a certain graphical figure.

In another embodiment consistent with the present invention, the game server may generate a single set of random numbers and transmit them to player terminals 402a–402g. Player terminals 402a–402n would then convert the single set of random numbers to game-specific numbers corresponding to the selected game at that terminal. This simplifies the tasks at the game server by generating only a single set of random numbers regardless of what games are selected at player terminals 402a–402n. Additionally, this embodiment alleviates the need for the game server to maintain enrollment information of player terminals 402a–402n. Player terminals 402a–402n would, however, need to perform additional computation in converting the set of random numbers to game-specific numbers. In any event, the centralization of the game server provides an efficient and effective means for controlling the games, increases the average number of games played, and helps reduce fraud.

Because of the predetermined interval between generations of random numbers, a player who makes a "play" during that interval, must wait until that interval expires before the player terminal 402a–402n receives the random number and determines a win or loss for that "play." The interval can, of course, be selected to be any predetermined interval to accommodate players and a provider of the system and games.

At customer service station 406, a player wishing to use a player terminal 402 can establish an account and receive a magnetic I.D. card to operate the player terminal 402. Preferably, a player provides an operator with some identifying information (e.g., name, social security number, address, and/or date of birth), and the operator uses terminal 420 to transmit this information to transaction processor subsystem 404. Transaction processor subsystem 404 establishes a gaming account file for the player in disk storage subsystem 506 and assigns a corresponding account number to that player. In addition, the operator may ask the customer to select a PIN via keypad 424. The player identifier information, the account number, and an encrypted version of the PIN is then stored on a magnetic strip on a magnetic I.D. card issued by the magnetic card issue system 422. Customer service station 406 may also include scanner 420 for scanning and storing a player's signature or photograph or scanning a player's drivers license. In one embodiment, the customer service station includes recognition software for detecting the player's identifying information (e.g., name, social security number, address, and/or date of birth) from the player's drivers license. In an alternative embodiment, the player's identifying information could be sent to the customer service station 406 before the guest arrives at the casino resort (e.g., via the Internet) so the player's card would be ready when the player arrived at the casino resort. Although not shown, customer service station 406 may include a camera for photographing the player and including a picture on the player's I.D. card. Transaction processor subsystem 404 stores the player's identification information in disk storage system 506. Such information may include the player's name, address, gender, birthday, and phone number. Any scanned information may be stored in a separate database.

After receiving an I.D. card, the player proceeds to a cashier station 408 to deposit money into his or her gaming account. An operator swipes the card through the magnetic card reader 426 to credit the gaming account via the keypad 424 after receiving payment from the player. Transaction processor subsystem 404 stores the player's gaming account information in disk storage system 504, preferably including the time, date, and amount of deposit as well as the resulting gaming account balance. Cashier station 408 may include a printer device to print, for example, customer receipts.

Cashier station 408 also serves to pay players having positive account balances at the end of their play sessions. To receive money, a player provides an operator at cashier station 408 with his/her I.D. card. The operator swipes the I.D. card to retrieve the account balance information from transaction processor subsystem 404, verifies the player by requesting the player to input his/her PIN via keypad 424, and pays the player any positive account balance. Transaction processor subsystem 404 stores the player's account information in disk storage system 506, preferably including the time, date, and amount of withdrawal as well as the resulting account balance. Although shown as two separate stations, cashier station 406 and customer service station 408 may be combined as a single customer service/cashier station. In addition, cashier station 406 and customer service station 408 may allow players to establish an interactive services account as described above in connection with FIG. 1. The video game and interactive services system preferably issues each player one card which the player uses to both play games and request services at player terminals 402*a*–402*n* or kiosk terminals 102*a*–102*n*.

Figure 6:
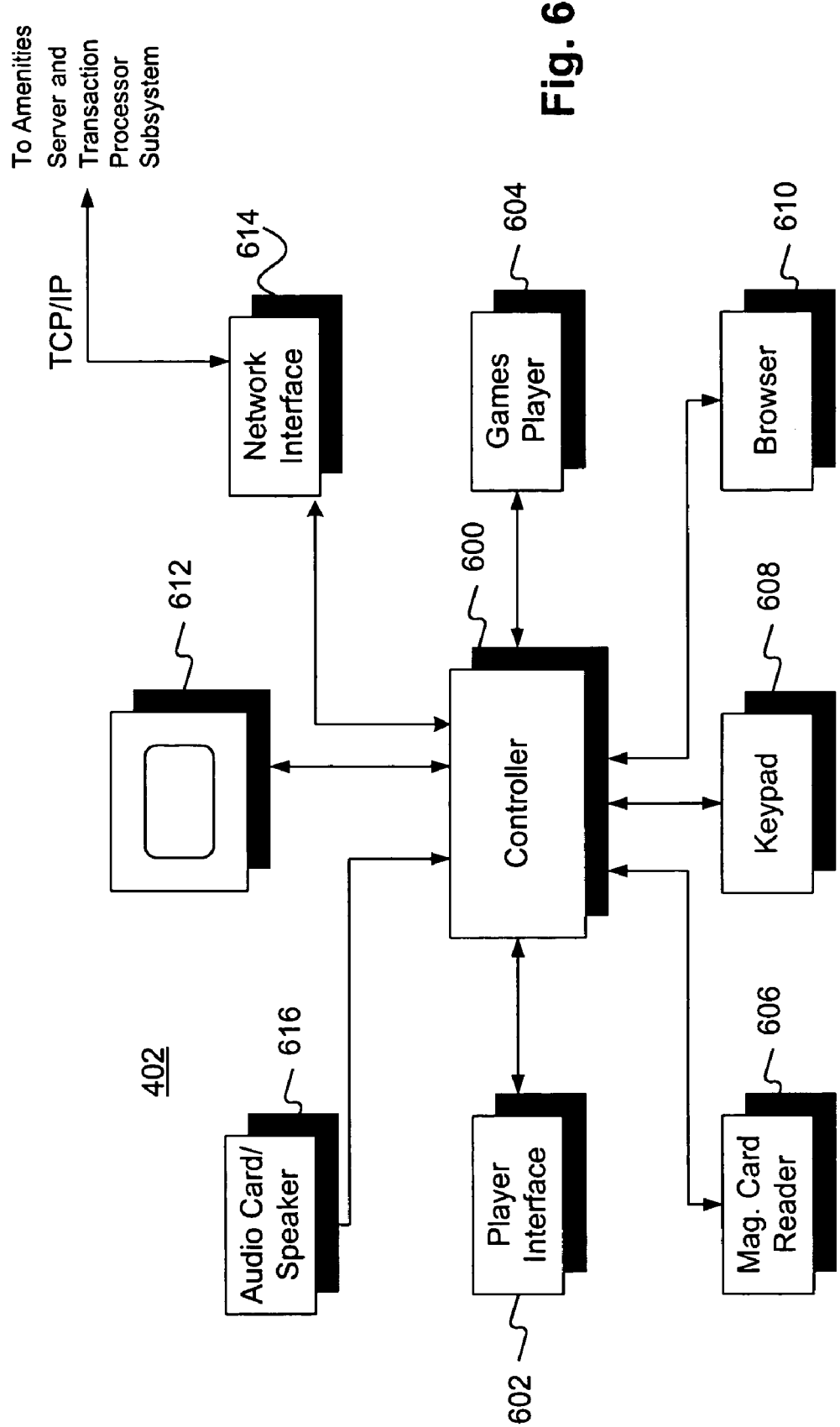
FIG. 6 is a block diagram of a player terminal consistent with the present invention.

FIG. 6 illustrates a block diagram of a player terminal 402 consistent with the present invention. Player terminals 402 accept a magnetic card or key (referred to generically as magnetic card), communicate with the transaction processor subsystem 404 to debit and credit a player's gaming account based on amounts wagered by the player for each game, and communicate with amenities server 402 to provide personalized messages, menus, and other multimedia information to the player, process service requests from the player, and debit a player's service account based on on-line purchases made by the player.

Referring to FIG. 6, player terminal 402 comprises a controller 600, a player interface 602, a game player 604, a magnetic card reader 606, a keypad 608, a browser 610, a video display/touch screen 612, a network interface 614, and a sound card/speaker module 616. Player interface 602 preferably comprises a software application for displaying attract mode graphics to attract a player to the player terminal. Game player 604 preferably comprises software applications running electronic games of chance, such as lotto, keno, bingo, etc. These games are preferably conventional video games of chance except that they either receive a random number from an external game server and base a win/lose result on that random number and the player's selection or they receive a scratch ticket from manufacturing computer 502 and base a win/lose result on that scratch ticket and the player's selection. Each player terminal 402 plays any one of several games independently of the others. Thus, within a group of player terminals such as player terminals 402*a*–402*n*, several players may be playing keno while others play lotto and still others play video poker.

Magnetic card reader 606 preferably comprises a conventional magnetic card reader capable of reading a credit card- or smart card-type player identification card. The type of card will dictate the type of card reader.

Keypad 608 preferably comprises a conventional alphanumeric or numeric key entry device. Keypad 608 permits a player to enter a PIN to verify the player at the player terminal 402. Sound card/speaker module 616 comprises a conventional sound card, amplifier, and speaker for presenting audio.

Video display 612 preferably comprises a conventional touch screen video monitor for displaying video graphics and receiving player inputs. A touch screen is not necessary, however, since player inputs can be made through keypad 608.

Browser 610 comprises a conventional software application for issuing HTTP requests to amenities server 104. Browser 610 can request a specific web page or ask amenities server 104 to perform a database query. Browser 610 reads HTML codes embedded in the web pages received from amenities server 104 to determine how, where, and in what colors and fonts the elements on the web pages must be displayed.

Network interface 614 transmits the requests from browser 610 to amenities server 104. The requests are broken into HTTP packets that are sent across the TCP/IP network infrastructure to the amenities server 104. Network interface 614 also receives incoming messages addressed to player terminal 402. In addition, network interface 614 checks for errors in transmission using, for example, CRC.

Although not shown, player terminal 402 may include a printer device to print, for example, web pages from amenities server 104 or lottery tickets.

To help illustrate the operation of the interactive services system consistent with the present invention, a preferred method of operation and system process will now be explained with reference to the system elements in FIGS. 1–6, the process flow diagram shown in FIGS. 7–8, and the graphical illustrations in FIGS. 9*a*–9*g*.

Figure 7:
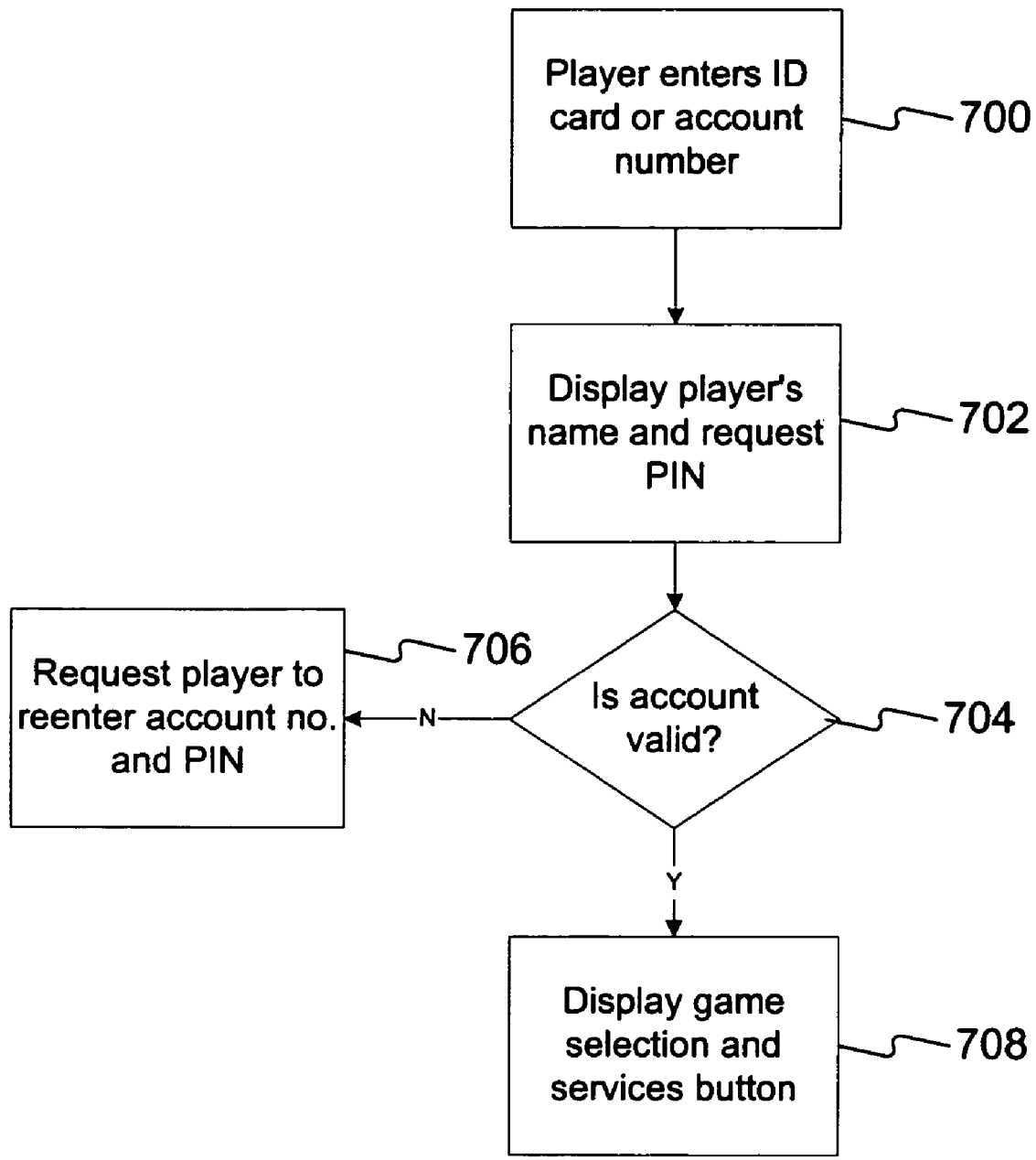
FIGS. 7 and 8 are process flow diagrams illustrating a method of operating a video game and interactive services system consistent with the present invention.

Referring to FIG. 7, after opening a services account and obtaining a guest I.D. card, a guest logs onto a player terminal 402 by inserting the I.D. card into the magnetic card reader 206 (step 700). Alternatively, the system does not require player I.D. cards, so the player simply enters his/her assigned services account number using the keypad.

The player terminal 402, which has been executing attract mode graphics, reads the information from the I.D. card, displays the player's name, and requests that the player enter his/her PIN (step 702). Player terminal 402 sends the account number to the transaction processing subsystem 402, and requests the transaction processing subsystem 402 to verify the player's account number. Transaction processing subsystem 402 receives the account number and, referring to disk storage system 506, determines whether the player account number and PIN number are valid (step 704). If not, player terminal 402 informs the player and either requests the player to reenter the account number and the PIN number or terminates the session (step 706). If the account number and pin are valid, then transaction processing subsystem 402 sends the player's account information and terminal preferences to player terminal 402. In response, player terminal 402 adjusts the player terminal preferences (e.g., reconfigures the graphics on video display/touch screen 612). Player terminal 402 also displays the game selection and a services button (step 708). If the player selects a video game, the system operates, for example, as described in U.S. patent application Ser. No. 08/877,375 or U.S. patent application Ser. No. 08/719,651.

Figure 8:
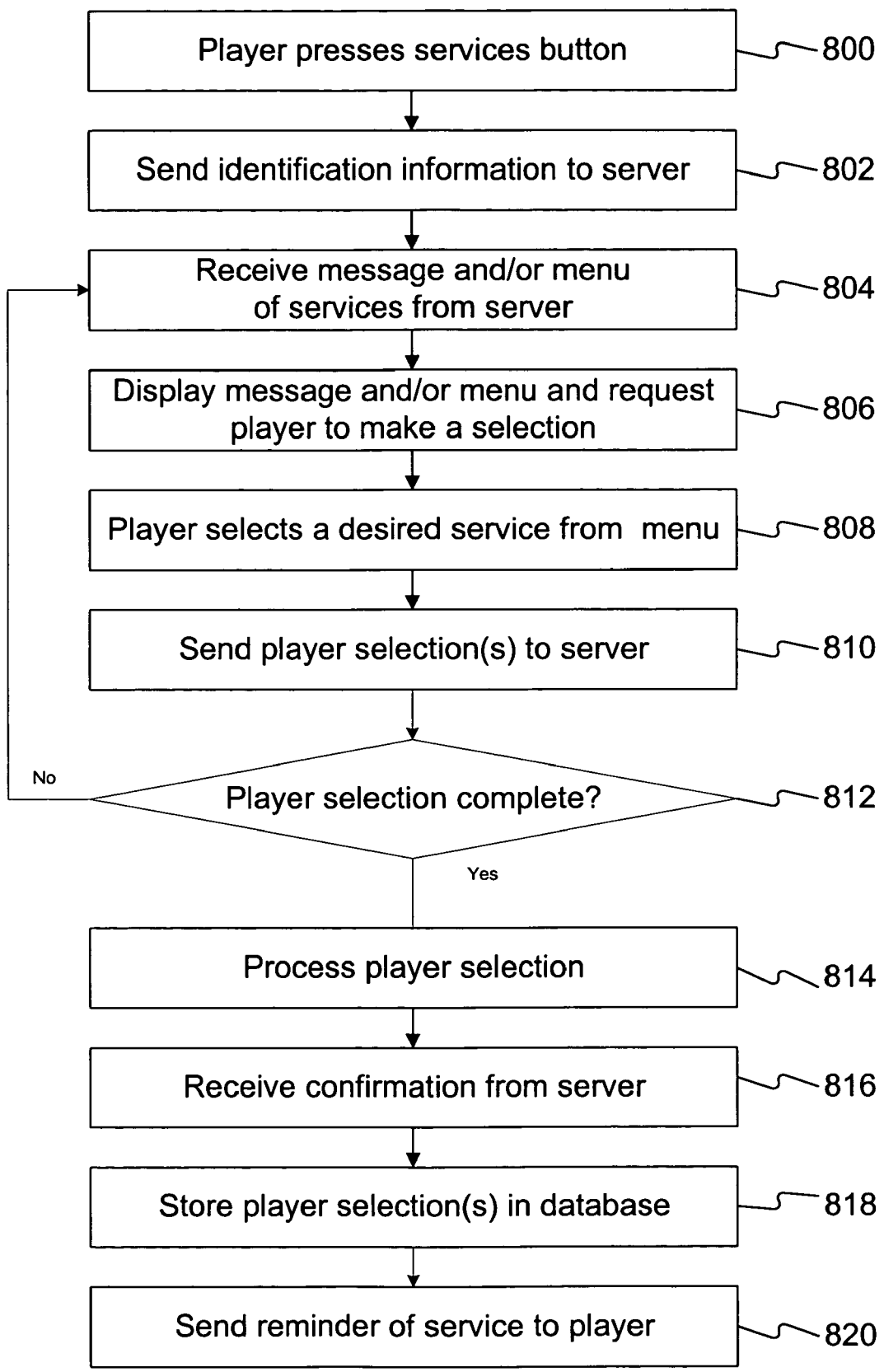
Figure 9B:
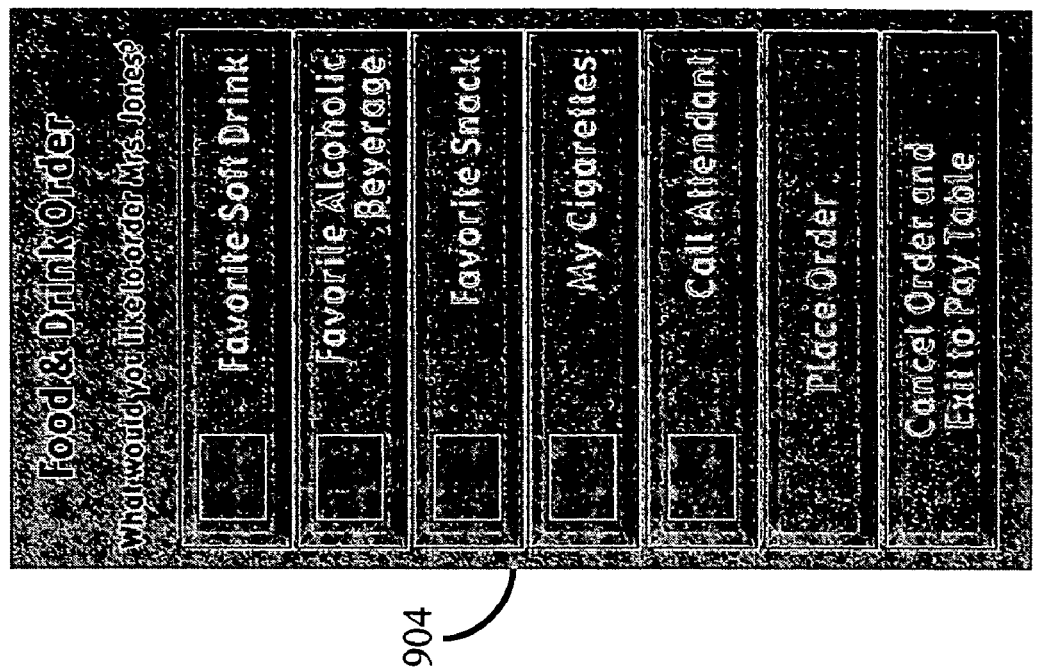
FIGS. 9a–9g are graphical illustrations of exemplary menus displayed on the player terminal in FIG. 6 consistent with the present invention.
Figure 9A:
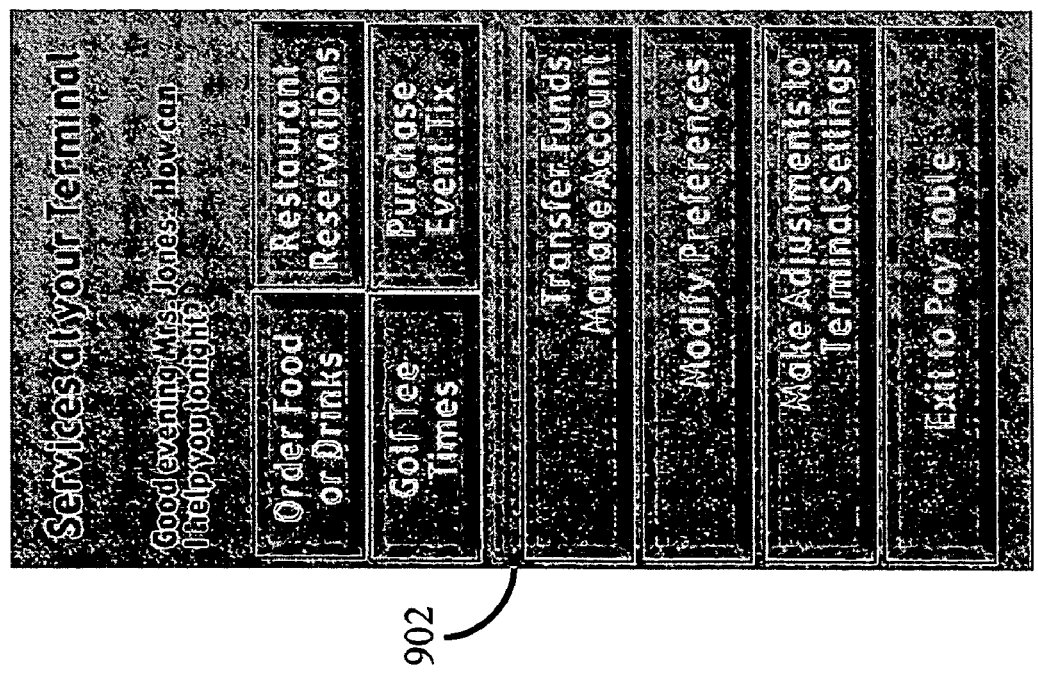

Referring to FIG. 8, a player at player terminal 402 presses a services button, located for example, on video display/touch screen 612 or keypad 608 (step 800). A player at player terminal 402 may press the service button at any time (i.e., before, during, or after playing video games). Player terminal 402 then sends the player identification information to amenities server 104 (step 802). Amenities server 104, referring to the preference information in database 306 corresponding to the received player identification information, preferably generates a personalized message for display to the player at player terminal 402. The personalized message may comprise, for example, a personal greeting, a menu of hospitality services tailored to the guest's preferences, an offer for a favorite drink on the house, or a solicitation to attend a concert similar to a concert previously attended by the player. In addition, player terminal 402 may receive a main menu of casino resort services from amenities server 104 (step 804). Player terminal 402 then displays personalized message and/or the main menu and requests the user to make a selection (step 806). FIG. 9*a* is a graphical illustration of a preferred main menu 902.

Figure 9D:
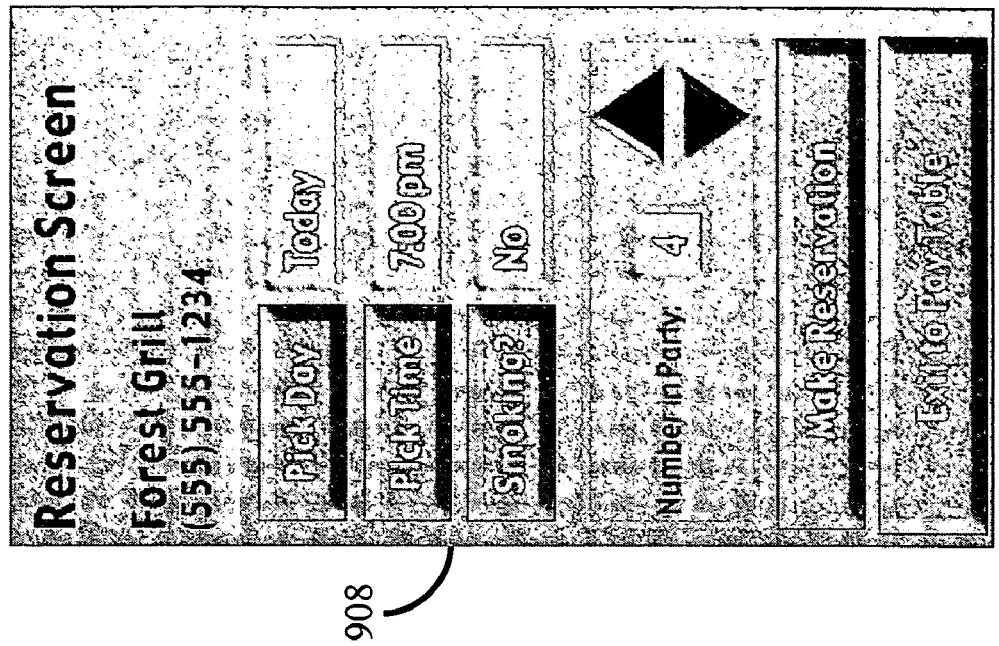
Figure 9C:
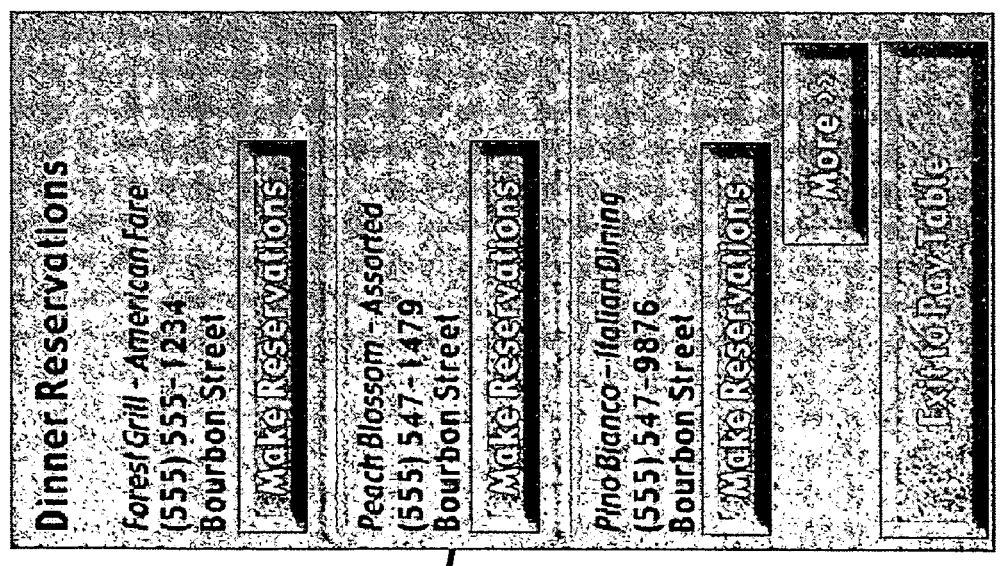
Figure 9F:
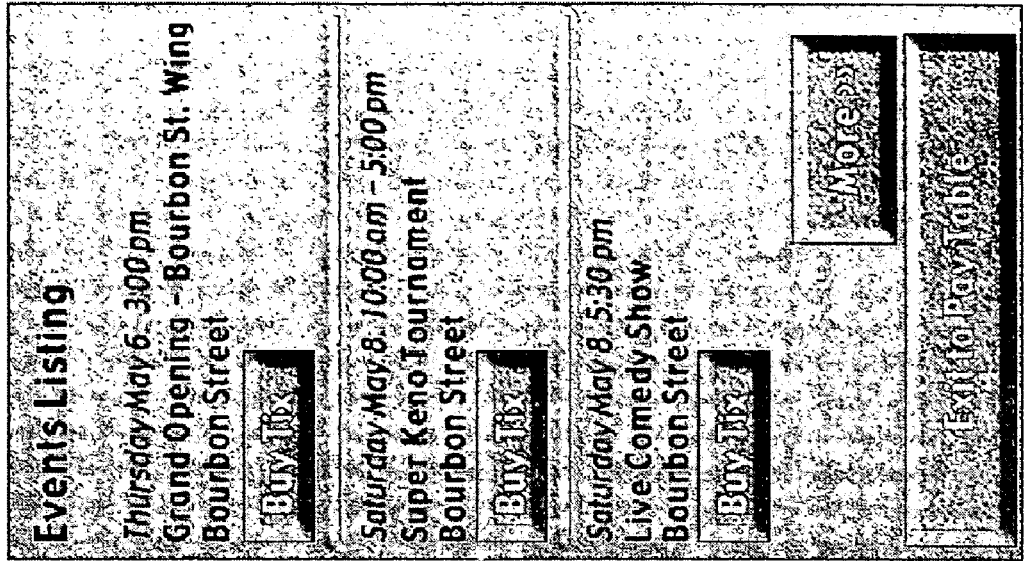
Figure 9E:
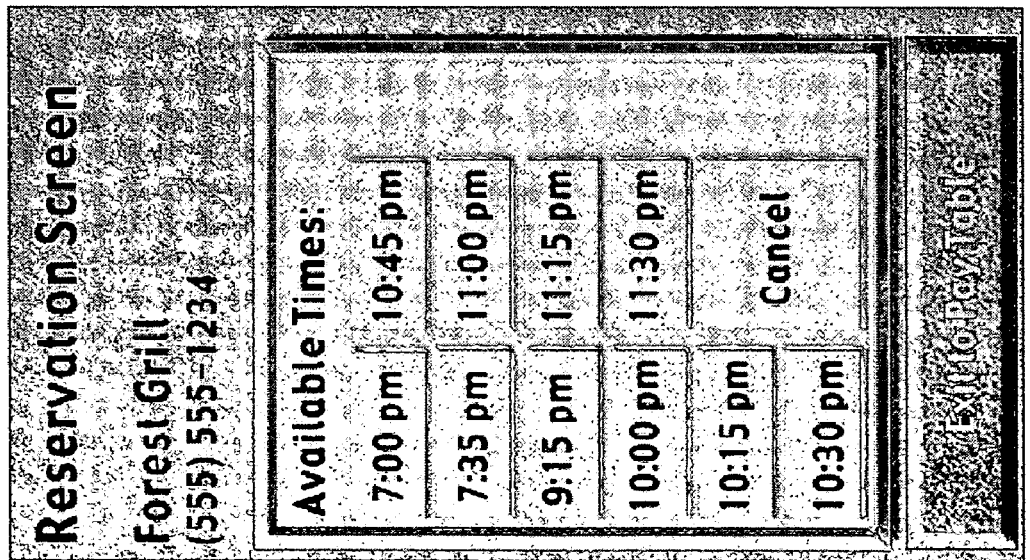

The player selects a desired casino resort service from main menu 902 by, for example, pressing video display/touch screen 612 (step 808). Player terminal 402 sends the player's selection to amenities server 104 (step 810). In response, if amenities server 104 needs more information to process the player's request (step 812), amenities server 104 may generate another menu, referring to the information stored in database 306 and send the menu to player terminal 402. The menus may be customized based on information in database 306. For example, when a player selects order food and drink from main menu 902, the player terminal 402 receives from amenities server 104 a list of the player's favorite beverages and snacks based on the player's service preference information stored in database 306. FIG. 9*b* is a graphical illustration of an exemplary food and drink order menu 904. When the player selects restaurant or golf reservations from main menu 902, the player terminal 402 receives from amenities server 104 a list of the available restaurants or golf courses in the order of their prior use by the player based on preference information stored in database 306. FIG. 9*c* is a graphical illustration of a preferred restaurant reservations menu 906. After the player selects the desired restaurant or golf course from menu 906, the player terminal receives from amenities server 904 a menu including default day, time, and smoking or non-smoking preferences based on preference data stored in the database 306. FIG. 9*d* is a graphical illustration of a preferred reservation/preference menu 908. If amenities server 104 determines that the time selected by the player is not available, the amenities server, referring to database 306, generates a list of available times and sends the list to player terminal 402. FIG. 9*e* is a graphical illustration of a preferred menu of available restaurant dining times 910.

As another example of a custom menu generated by amenities server 104, when the user selects purchase event tickets on main menu 902, the amenities server, referring to database 306, generates a list of all events scheduled to occur within a future time period (e.g., the next 30 days) and sends the list to player terminal 402. In addition, based on preference information in database 306, the events menu could be organized so that the events similar to those purchased by the player in the past would be presented first. FIG. 9*f* is a graphical illustration of a preferred menu of events.

Using video display/touch screen 612, the player selects desired options on the menu(s) from amenities server 104 (step 808). Player terminal 402 sends the player's selection(s) to amenities server 104 (step 810). After the player has browsed through the menus and entered his/her selections such that the player's request is complete (step 812), amenities server 104 processes the user's request (step 814). The processing steps differ depending on the type of hospitality resort service selected by the player. For example, if the player placed a food and drink order, amenities server 104 preferably determines whether sufficient funds exist in the player's services account, and if so, debits the player's services account and sends the order to service-client station 106*c*. Alternatively, if the player requested a transfer of funds between the player's services account and the player's gaming account, the amenities server 104 preferably interacts with transaction processor subsystem 104 to debit and credit the service and gaming accounts as requested. In addition, if the player requested a restaurant reservation, a golf tee time, or a similar reservation, amenities server 104 preferably sends the reservation information to a service-client station 106 located at the selected facility (e.g., service-client station 106*a* at the hostess station in a restaurant or service-client station 106*b* in the club house of a golf course).

Figure 9G:
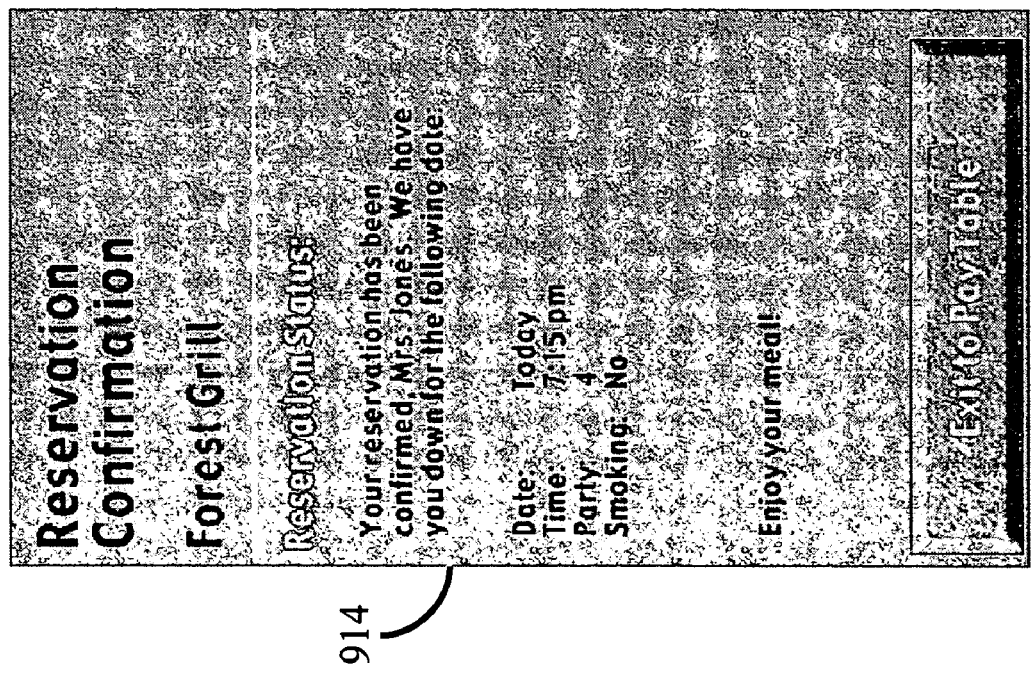

After processing the service request, amenities server 104 sends player terminal 402 confirmation of the selected service (step 816). In a preferred embodiment, amenities server 104 sends a confirmation page and requests player terminal 402 to display the confirmation page to the player. FIG. 9*g* is a graphical illustration of an exemplary confirmation page 914.

After each transaction processed by amenities server 104, amenities server 104 stores the player's selection(s) in database 306 (step 818). In this manner, amenities server 104 stores player preference data on a per transaction basis, creating a dynamic interactive services operating system capable of offering guests their favorite services even as guests develop new preferences.

In the case of reservations, amenities server 104 preferably sends the player a reminder (step 820). For example, amenity server 104 might send the player a reminder of a lunch reservation at some predetermined time period before the lunch reservation (e.g., fifteen minutes prior to the reservation). Amenities server 104 first determines whether the player is logged on to a player terminal 402 or kiosk terminal 102, by referring to database 306 (or asking transaction processor subsytem 404 to refer to disk storage system 506). If so, amenities server 104 sends a message to the appropriate player terminal 402 or kiosk terminal 102 for display to the player.

An interactive services system consistent with the present invention may provide premium services to special guests, such as frequent guests or high rollers. For example, a restaurant at the hospitality facility may reserve a number of tables just for special guests, a golf course may give priority tee times to special guests, or a ticket office may reserve the front rows of a concert for special guests. Amenities server 104 and service-client stations 106*a*–106*n* keep track of the premium services, determine whether a guest qualifies for premium services, and provide prioritized service to special guests.

Although described in the context of player terminals 402, the method in FIGS. 7 and 8 generally applies to kiosk terminals 102 as well. Login for kiosk terminals 102, however, is preferably performed by amenities server 104 instead of transaction processor subsystem 404. In addition, kiosk terminals 102, unlike player terminals 402, are not primarily dedicated to gaming. Consequently, kiosk terminals 102 may display more detailed menus and allow guests to browse through more informative web sites. For example, by following a series of embedded menus received from amenities server 104 for display on kiosk terminal 102, a guest can select different golf courses, view the layout of each golf course, view the stats for each hole, and even view a graphical representation of the greens of the selected golf course. In another example, after selecting a particular restaurant, the guest can view on kiosk terminal 102 the restaurant menu, directions to the restaurant, and other information about the restaurant.

In addition, in a preferred embodiment, guests can view the menus on kiosk terminals 102 without inserting a guest identification number or card. However, if the guest wishes to perform a transaction (e.g., purchase merchandise or reserve a time), entry of a guest identification number or card is preferably required.

Additional benefits may be realized as well. Previously, when a casino resort desired to install new game software or software upgrades on player terminals 402, the casino resort would have to tediously install the software at each individual player terminal 402. With thousands of player terminals, this process could consume significant time and resources. Central distribution of software overcomes these disadvantages.

Figure 10:
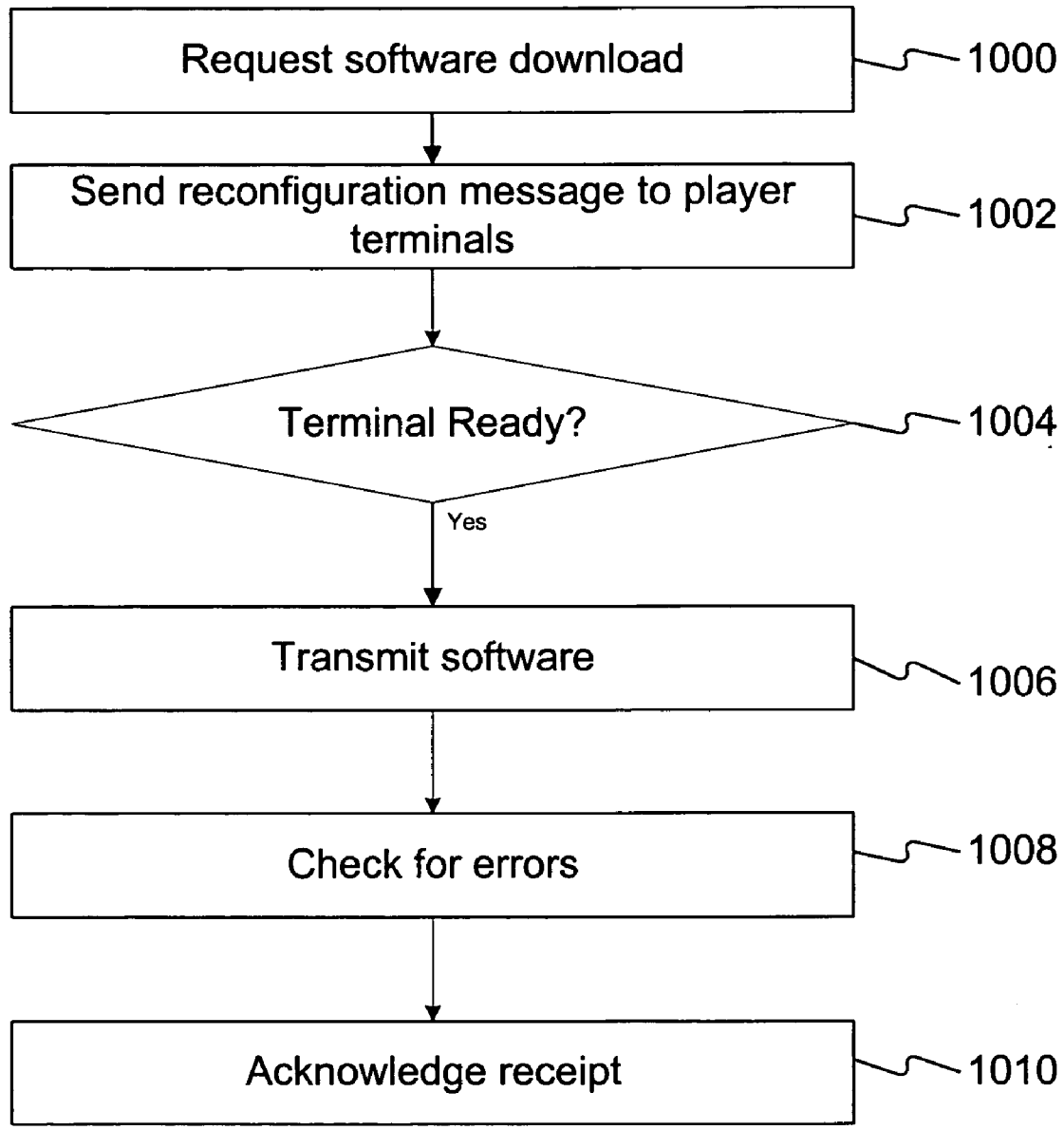
FIG. 10 is a process flow diagram illustrating a method of updating player terminal software consistent with the present invention.

A preferred method of operation and system process will be explained with reference to the system elements in FIGS. 4–6 and the process flow diagram in FIG. 10. At management and reporting station 410, the network administrator or other authorized operator requests a software download (step 1000). The operator can select one or more player terminals to receive the software. Management and reporting station 410 sends a message to the transaction processor subsystem 404 to perform a software download to player terminals 402. The operator at management and reporting station 410 specifies the new software or software upgrade, stored in disk storage system 506, to be sent to the specified player terminals 402.

Transaction engine 514 sends a reconfiguration message to the selected player terminals 402 via front end processor 512 (step 1002). When ready, player terminals 402 send a terminal ready message to transaction engine 514 (step 1004). When the designated player terminals 402 are ready (step 1004), transaction processor subsystem 404 sequentially transmits the software to each of the designated and ready player terminals 402. After the download is complete, front end processor 512 and player terminal 402 verify the accuracy of the download using CRC (step 1008). After the download is verified, player terminals 402 send an acknowledge message to transaction processor subsystem 404 (step 1010).

Transaction processor subsystem 404 preferably sends management and reporting station 410 status information, indicating, for example, whether the software download is =complete and successful. At that point, the operator at management and reporting station 410 may request that the player terminals with the successfully downloaded software be rebooted. The management and reporting station 410 sends a reboot request to transaction processor subsystem 404 which then reboots the selected player terminals.

In the same way, systems and methods consistent with the present invention can allow the network administrator or other authorized operator to remotely reconfigure player terminals 402 from management and reporting station 410. Again, transaction processor subsystem 404 sends player terminals 402 a reconfiguration message. The player terminals 402 respond with a terminal ready message. The transaction processor subsystem 404 then sequentially sends the configuration information (e.g., background color of graphics, sound of bells, pattern of lights) to player terminals 402.

An interactive services system consistent with the present invention allows instant messages to be sent to guests logged in at player terminals 402a–402n or kiosk terminals 102a–102n. Amenities server 104 (and/or transaction processor subsystem 404) routes instant messages between the network modules. This feature could be especially useful to guests who cannot locate their travel companions on, for example, the casino floor. Amenities server 104 (and/or transaction processor subsystem 404) receives a message from, for example, management and reporting station 410 intended for a particular guest who has an activated account.

Amenities server 104 (and/or transaction processor subsystem 404) determines whether the intended recipient is currently logged in at player terminal 402a–402n or kiosk terminal 102a–102n. This could done in any variety of ways. For example, amenities server 104 could compare the account number corresponding to the intended recipient to the account numbers received from player terminals 402a–402n and kiosk terminals 102a–102n. Alternatively, a flag may be set in database 306 and/or disk storage system 506 whenever a player logs in on a player terminal 402 or a kiosk terminal 102. Amenities server 104 could look up the flag in database 306 and/or disk storage subsystem 506 to determine whether the intended recipient is logged in at a terminal.

In the event the guest is not logged in, amenities server 104 sends a guest not logged in LAW OFFICES message to management and reporting station 410. Alternatively, if the guest is logged in, amenities server 104 looks up the address of the player terminal 402 or kiosk terminal 102 where the guest is logged in and sends the message to that terminal. In addition, amenities server 104 sends an acknowledgment message to management and reporting system 410. If desired, for privacy reasons, amenities server 104 will not inform the operator at management and reporting station 410 that the guest is logged in unless the guest gives permission for such information to be shared.

The messaging feature of the present invention may be used in a video game system 400, in an interactive service system 100, or in a combined video game and interactive services system like the one shown in FIG. 4.

This description describes the presently preferred embodiments and methods consistent with the present invention, but those skilled in the art would recognize that various changes and modifications may be made, and equivalents may be substituted without departing from the scope and spirit of the invention.

For example, while the video game and interactive services system has been described as storing data in two different database systems with some replication of the stored data. However, one of ordinary skill would appreciate that all data, including gaming and services data, could be stored in one database system.

In addition, many modifications may be made to adapt a particular element, technique or implementation to the teachings of the present invention without departing from the scope of the invention. Therefore, this invention should not be limited to the particular embodiments and methods disclosed herein, but that the invention include all embodiments falling within the scope of the appended claims.

We claim:
1. A hospitality facility operating system, comprising:
 a plurality of client terminals coupled together, each client terminal including means for receiving identification information from a participating one of the hospitality facility guests, means for displaying a menu of hospitality facility services provided by the hospitality facility,
means for receiving selection information from the participating guest indicating a desired hospitality facility service, and
means for transmitting the identification information and selection information;
a services account server;
a gaming account server separate from the services account server; and
a central service controller, connected to each of the plurality of client terminals, the services account server, and the gaming account server, and including
means for establishing a gaming account on the gaming account server for hospitality facility guests,
means for establishing a non-gaming services account on the services account server for hospitality facility guests,
means for storing guest preference information in the non-gaming services account for hospitality facility guests,
means for receiving from the client terminals the identification information and the selection information, and
means for transmitting, to the client terminals, a response based on the selection information or the identification information,
wherein said means for transmitting the response sends a confirmation of the selection, and
wherein said means for transmitting the response sends a reminder of the selection.

2. The hospitality facility operating system of claim 1, wherein said means for transmitting a response sends a message based on the stored guest preference information corresponding to the received identification information.

3. The hospitality facility operating system of claim 2, wherein said means for transmitting a response sends a menu of hospitality facility services.

4. The hospitality facility operating system of claim 1, said gaming account server further comprising means for storing gaming account information for each of the guests.

5. The hospitality facility operating system of claim 1, said services account server comprises means for storing non-gaming service account information.

6. The hospitality facility operating system of claim 1, said central service controller further comprising means for determining whether the selection is available.

7. The hospitality facility operating system of claim 1, wherein at least one of said plurality of client terminals includes a video game terminal.

8. The hospitality facility operating system of claim 1, wherein the means for displaying a menu of hospitality facility services displays a restaurant reservation menu.

9. The hospitality facility operating system of claim 1, wherein the means for displaying a menu of hospitality facility services displays a golf tee time reservation menu.

10. The hospitality facility operating system of claim 1, wherein the means for displaying a menu of hospitality facility services displays a purchase event tickets menu.

11. The hospitality facility operating system of claim 1, wherein the means for displaying a menu of hospitality facility services displays a food and drink menu.

12. The hospitality facility operating system of claim 1, the central service controller further comprising:
means for receiving a message addressed to a particular hospitality facility guest;
means for comparing the message address to the identification information from each client terminal to determine whether the particular hospitality facility guest is logged onto a client terminal; and
means for sending the message to the particular hospitality facility guest.

13. The hospitality facility of claim 12, further comprising a management station for generating the message and sending the message to the central service controller.

14. The hospitality facility of claim 13, said central service controller further comprising:
means for sending a not logged in message to the management station if the particular hospitality facility guest is not logged onto a client terminal.

15. A hospitality facility operating system, comprising:
a plurality of client terminals, each client terminal including
means for receiving identification information from a participating one of the hospitality facility guests,
means for displaying a menu of hospitality facility services provided by the hospitality facility,
means for receiving selection information from the participating guest indicating a desired hospitality facility service, and
means for transmitting the selection information;
a gaming account server separate from the services account server; and
a central service controller, connected to the plurality of client terminals, the services account server, and the gaming account server, and including
means for establishing a gaming account on the gaming account server for each of the guests,
means for establishing a non-gaming services account on the services account server for each of the guests,
means for storing guest preference information in the non-gaming services account for each of the guests,
means for receiving from the client terminals the transmitted selection information after each selection,
means for adjusting the preference information of the guest according to the guest selection information after each selection, and
means for transmitting, to the client terminals, a response based on the selection information or the identification information,
wherein said means for transmitting the response sends a confirmation of the selection, and
wherein said means for transmitting the response sends a reminder of the selection.

16. The hospitality facility operating system of claim 15, the central service controller further comprising:
means for generating the menu of hospitality facility services and transmitting the menu of hospitality facility services to the client terminals.

17. The hospitality facility operating system of claim 16, wherein the means for generating the menu of hospitality facility services includes means for generating the menu based on the guest preference information corresponding to the received identification information.

18. A method of operating an interactive hospitality facility ordering and scheduling system comprising:
establishing a non-gaming services account file, including guest preference information, on a services account server in communication with a central service controller for a guest;
establishing a gaming account file for the guest on a gaming account server in communication with the central service controller, wherein the gaming account server is a separate server from the services account server;

receiving, at a terminal coupled to the central service controller, guest identification information input by the guest;

displaying, on a video display of the terminal, a menu of hospitality facility services provided by the hospitality facility;

receiving, at the terminal, selection information indicating a desired hospitality facility service from the guest;

sending, by the terminal to the central service controller, the guest identification information and the selection information; and sending, by the central service controller to the terminal, responses based on the guest identification information or the selection information, wherein one of said responses is a confirmation of the selection, and wherein another of said responses is a reminder of the selection.

19. The method of claim 18, wherein said responses include a personalized message based on the stored guest preference information corresponding to the received identification information.

20. The method claim 18, further comprising:
storing, at the services account server, non-gaming service account information for each of the guests.

21. The method of claim 18, further comprising:
determining, by the central service controller, whether the selection is available.

22. The method of claim 18, wherein at least one of said plurality of terminals includes a video game terminal.

23. The method of claim 18, wherein the hospitality facility services include reserving a table at a restaurant.

24. The method of claim 18, wherein the hospitality facility services include reserving a golf tee time.

25. The method of claim 18, wherein the hospitality facility services include purchasing tickets for an entertainment event.

26. The method of claim 18, wherein the hospitality facility services include ordering food or drink.

27. The method of claim 18, further comprising:
receiving, by the central service controller, a message addressed to a particular hospitality facility guest; and
comparing, by the central service controller, the message address to the identification information received from the terminal to determine whether the particular guest is logged onto the terminal.

28. The method of claim 27, further comprising:
sending, by the central service controller, the message to the particular hospitality facility guest.

29. The method of claim 28, further comprising:
sending, by the central service controller, a guest not available message if the particular hospitality facility guest is not logged onto a terminal.

30. A hospitality facility operating system, comprising:
a plurality of client terminals coupled together, each terminal including
a card reader for receiving identification information from a participating one of the hospitality facility guests,
a display for displaying a menu of hospitality facility services provided by the hospitality facility,
a touch screen for receiving selection information from the participating guest indicating a desired hospitality facility service, and
a first network interface for transmitting the identification information and the selection information; and a central service controller, connected to each of the plurality of client terminals, and including
a services database for storing guest preference information for each of the participating guests in a non-gaming services account,
a gaming database for storing gaming account information for each of the participating guests in a gaming account separate from the non-gaming services account,
a second network interface for receiving from the client terminals the identification information and the selection information,
a database server for retrieving guest preference information corresponding to the received identification information, and
a processor for generating messages and a hospitality services menu based on the retrieved guest preference information or the selection information,
wherein said display displays a confirmation message of the service selected by the guest, and
wherein the display displays a reminder message of the service selected by the guest.

31. The hospitality facility operating system of claim 30, wherein the display displays a hospitality services menu based on the retrieved guest preference information.

32. The hospitality facility operating system of claim 30, said central service controller further comprising a processor for determining whether the service selected by the guest is available.

33. The hospitality facility operating system of claim 30, wherein at least one of said plurality of client terminals includes a video game terminal.

34. The hospitality facility operating system of claim 30, wherein the menu of hospitality facility services includes reserving a table at a restaurant.

35. The hospitality facility operating system of claim 30, wherein the menu of hospitality facility services includes reserving a golf tee time.

36. The hospitality facility operating system of claim 30, wherein the menu of hospitality facility services includes purchasing tickets for an entertainment event.

37. The hospitality facility operating system of claim 30, wherein the menu of hospitality facility services includes ordering food or drink.

38. A computer readable medium including program instructions for carrying out the method of
establishing non-gaming services account files for guests of a hospitality facility on a services account server;
establishing gaming account files for the guests on a gaming account server that is separate from the services account server;
receiving guest identification information input by a participating guest;
displaying on a video display menus of services provided by the hospitality facility separate from the video display;
receiving from the participating guest selection information indicating a desired one of the hospitality services;
updating the services account file of the participating guest according to the selection information after each selection by the participating guest; and
sending to the participating guest a confirmation and a reminder regarding the participating guest selection information.

* * * * *

UNITED STATES PATENT AND TRADEMARK OFFICE
CERTIFICATE OF CORRECTION

| | | |
|---|---|---|
| PATENT NO. | : 7,022,017 B1 | Page 1 of 1 |
| APPLICATION NO. | : 09/488566 | |
| DATED | : April 4, 2006 | |
| INVENTOR(S) | : Arthur R. Halbritter et al. | |

It is certified that error appears in the above-identified patent and that said Letters Patent is hereby corrected as shown below:

On the title page, item (75), line 4, "Lavole," should read --Lavoie,--.

In claim 20, column 19, line 23, "method claim" should read --method of claim--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,022,017 B1 | Page 1 of 1 |
| APPLICATION NO. | : 09/488556 | |
| DATED | : April 4, 2006 | |
| INVENTOR(S) | : Arthur R. Halbritter et al. | |

It is certified that error appears in the above-identified patent and that said Letters Patent is hereby corrected as shown below:

On the title page, item (75), line 4, "Lavole," should read --Lavoie,--.

In Claim 20, column 19, line 23, "method claim" should read --method of claim--.

This certificate supersedes Certificate of Correction issued August 8, 2006.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,022,017 B1
APPLICATION NO. : 09/488556
DATED : April 4, 2006
INVENTOR(S) : Arthur R. Halbritter et al.

Page 1 of 1

It is certified that error appears in the above-identified patent and that said Letters Patent is hereby corrected as shown below:

On the title page, item (75), line 4, "Lavole," should read --Lavoie,--.

In Claim 15, column 18, immediately preceding line 24, insert -- a services account server;--.

In Claim 20, column 19, line 23, "method claim" should read --method of claim--.

This certificate supersedes Certificate of Correction issued August 8, 2006 and September 5, 2006.

Signed and Sealed this

Twentieth Day of February, 2007

JON W. DUDAS
*Director of the United States Patent and Trademark Office*